US012731858B2

(12) United States Patent
Fan et al.

(10) Patent No.: US 12,731,858 B2
(45) Date of Patent: Sep. 8, 2026

(54) OXIDIZED BACTERIAL CELLULOSE SEPARATOR FOR BATTERIES AND METHOD FOR PRODUCING THE SAME

(71) Applicants: Zhaoyang Fan, Chandler, AZ (US); Wenyue Li, Chandler, AZ (US); Shu Wang, Chandler, AZ (US)

(72) Inventors: Zhaoyang Fan, Chandler, AZ (US); Wenyue Li, Chandler, AZ (US); Shu Wang, Chandler, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 800 days.

(21) Appl. No.: 18/154,037

(22) Filed: Jan. 12, 2023

(65) Prior Publication Data

US 2023/0223651 A1 Jul. 13, 2023

Related U.S. Application Data

(60) Provisional application No. 63/299,164, filed on Jan. 13, 2022.

(51) Int. Cl.

| | |
|---|---|
| ***H01M 50/429*** | (2021.01) |
| ***H01M 10/052*** | (2010.01) |
| ***H01M 50/403*** | (2021.01) |
| ***H01M 50/431*** | (2021.01) |
| ***H01M 50/434*** | (2021.01) |
| ***H01M 50/446*** | (2021.01) |

(52) U.S. Cl.

CPC ..... *H01M 50/4295* (2021.01); *H01M 50/403* (2021.01); *H01M 50/431* (2021.01); *H01M 50/434* (2021.01); *H01M 50/446* (2021.01); *H01M 10/052* (2013.01)

(58) Field of Classification Search

None

See application file for complete search history.

(56) References Cited

U.S. PATENT DOCUMENTS

| | | | | |
|---|---|---|---|---|
| 10,164,230 | B2 | 12/2018 | Kang | |
| 2009/0309072 | A1 | 12/2009 | Hwang | |
| 2011/0076572 | A1* | 3/2011 | Amine | H01M 10/05 429/328 |
| 2016/0190534 | A1* | 6/2016 | Kimura | H01M 50/403 536/56 |
| 2020/0052272 | A1* | 2/2020 | Park | H01M 50/414 |
| 2022/0216521 | A1* | 7/2022 | Xie | H01M 10/0569 |

FOREIGN PATENT DOCUMENTS

| | | | | |
|---|---|---|---|---|
| JP | 2014086285 A * | 5/2014 | | |
| KR | 20200042220 A * | 4/2020 | | B01D 71/12 |
| WO | WO-2021103435 A1 * | 6/2021 | | H01M 10/0569 |

OTHER PUBLICATIONS

Machine translation of JP2014-086285A, published on May 12, 2014 (Year: 2014).*

Machine translation of KR2020-0042220A, published on Apr. 23, 2020 (Year: 2020).*

Araújo, Inês MS, et al. "Hydrothermal synthesis of bacterial cellulose-copper oxide nanocomposites and evaluation of their antimicrobial activity." Carbohydrate polymers 179 (2018): 341-349.

Arora, Pankaj, and Zhengming Zhang. "Battery separators." Chemical reviews 104.10 (2004): 4419-4462.

Bauer, I., et al. "Reduced polysulfide shuttle in lithium-sulfur batteries using Nafion-based separators." Journal of Power Sources 251 (2014): 417-422.

Braddock, D. Christopher, et al. "Tetramethyl orthosilicate (TMOS) as a reagent for direct amidation of carboxylic acids." Organic letters 20.4 (2018): 950-953.

Bruce, Peter G., and Colin A. Vincent. "Steady state current flow in solid binary electrolyte cells." Journal of electroanalytical chemistry and interfacial electrochemistry 225.1-2 (1987): 1-17.

Canas, Natalia A., et al. "Investigations of lithium-sulfur batteries using electrochemical impedance spectroscopy." Electrochimica Acta 97 (2013): 42-51.

Chanthiwong, Monthakarn, et al. "Controlling the processing of co-precipitated magnetic bacterial cellulose/iron oxide nanocomposites." Materials & Design 196 (2020): 109148.

Chen, Dongjiang, et al. "Separator modification and functionalization for inhibiting the shuttle effect in lithium-sulfur batteries." physica status solidi (RRL)-Rapid Research Letters 12.10 (2018): 1800249.

Chen, Kuan-Hung, et al. "Dead lithium: mass transport effects on voltage, capacity, and failure of lithium metal anodes." Journal of Materials Chemistry A 5.23 (2017): 11671-11681.

Chen, Meiyan, et al. "Bacterial cellulose supported gold nanoparticles with excellent catalytic properties." ACS Applied Materials & Interfaces 7.39 (2015): 21717-21726.

Cheng, Xin-Bing, et al. "Toward safe lithium metal anode in rechargeable batteries: a review." Chemical reviews 117.15 (2017): 10403-10473.

(Continued)

*Primary Examiner* — Anca Eoff

(74) *Attorney, Agent, or Firm* — FULLER IP LAW LLC; Rodney J. Fuller

(57) ABSTRACT

A separator for a lithium-based battery, and method for fabricating the same is disclosed. The method includes oxidizing cellulose fibrils to form oxidized cellulose having carboxylic functional groups, decorating the oxidized cellulose with nanoparticles, and forming the nanoparticle-decorated oxidized cellulose into a film to become the separator for the lithium-based battery. The cellulose may be a bacterial cellulose. The cellulose fibrils may be oxidized through a TEMPO oxidation. Decorating the oxidized cellulose with nanoparticles may include introducing a precursor solution to the oxidized cellulose that reacts with hydroxyl groups of the oxidized cellulose while preserving the carboxylic functional groups, causing the nanoparticles to nucleate on the surface of the oxidized cellulose. The nanoparticles may be composed of an oxide material. The oxide material may be $SiO_2$. The precursor solution may be tetraethyl orthosilicate (TEOS).

6 Claims, 28 Drawing Sheets

(56) References Cited

OTHER PUBLICATIONS

Cheng, Xin-Bing, Jia-Qi Huang, and Qiang Zhang. "Li metal anode in working lithium-sulfur batteries." Journal of The Electrochemical Society 165.1 (2018): A6058-A6072.
Cheng, Xin-Bing, et al. "A review of solid electrolyte interphases on lithium metal anode." Advanced science 3.3 (2016): 1500213.
Chi, Shang-Sen, et al. "Prestoring lithium into stable 3D nickel foam host as dendrite-free lithium metal anode." Advanced Functional Materials 27.24 (2017): 1700348.
Chu, Hyunwon, et al. "Achieving three-dimensional lithium sulfide growth in lithium-sulfur batteries using high-donor-number anions." Nature communications 10.1 (2019): 188.
Deng, Kuirong, et al. "Single-ion conducting artificial solid electrolyte interphase layers for dendrite-free and highly stable lithium metal anodes." Journal of Materials Chemistry A 7.21 (2019): 13113-13119.
Fang, Chengcheng, Xuefeng Wang, and Ying Shirley Meng. "Key issues hindering a practical lithium-metal anode." Trends in Chemistry 1.2 (2019): 152-158.
Ghazi, Zahid Ali, et al. "Efficient polysulfide chemisorption in covalent organic frameworks for high-performance lithium-sulfur batteries." Advanced Energy Materials 6.24 (2016): 1601250.
Ghazi, Zahid Ali, et al. "MoS2/celgard separator as efficient polysulfide barrier for long-life lithium-sulfur batteries." Advanced materials 29.21 (2017): 1606817.
Grande, Lorenzo, et al. "The lithium/air battery: still an emerging system or a practical reality ?. " Advanced materials 27.5 (2015): 784-800.
Gueon, Donghee, Min-Young Ju, and Jun Hyuk Moon. "Complete encapsulation of sulfur through interfacial energy control of sulfur solutions for high-performance Li- S batteries." Proceedings of the National Academy of Sciences 117.23 (2020): 12686-12692.
Guo, Juchen, et al. "Lithium-sulfur battery cathode enabled by lithium-nitrile interaction." Journal of the American Chemical Society 135.2 (2013): 763-767.
Guo, Yanpeng, Huiqiao Li, and Tianyou Zhai. "Reviving lithium-metal anodes for next-generation high-energy batteries." Advanced materials 29.29 (2017): 1700007.
Han, Pauline, Sheng-Heng Chung, and Arumugam Manthiram. "Designing a high-loading sulfur cathode with a mixed ionic-electronic conducting polymer for electrochemically stable lithium-sulfur batteries." Energy Storage Materials 17 (2019): 317-324.
He, Yibo, et al. "Porous hybrid aerogels with ultrahigh sulfur loading for lithium-sulfur batteries." Journal of Materials Chemistry A 6.19 (2018): 9032-9040.
Huang, Jia-Qi, et al. "Ionic shield for polysulfides towards highly-stable lithium-sulfur batteries." Energy & environmental science 7.1 (2014): 347-353.
Huang, Jia-Qi, et al. "Permselective graphene oxide membrane for highly stable and anti-self-discharge lithium-sulfur batteries." ACS nano 9.3 (2015): 3002-3011.
Huang, Jia-Qi, Qiang Zhang, and Fei Wei. "Multi-functional separator/interlayer system for high-stable lithium-sulfur batteries: Progress and prospects." Energy Storage Materials 1 (2015): 127-145.
Huang, Yang, et al. "Recent advances in bacterial cellulose." Cellulose 21.1 (2014): 1-30.
Ifuku, Shinsuke, et al. "Synthesis of silver nanoparticles templated by TEMPO-mediated oxidized bacterial cellulose nanofibers." Biomacromolecules 10.9 (2009): 2714-2717.
Iguchi, Masahiro, Shinya Yamanaka, and Arief Budhiono. "Bacterial cellulose—a masterpiece of nature's arts." Journal of materials science 35.2 (2000): 261-270.
Islam, Nazifah, et al. "High-frequency electrochemical capacitors based on plasma pyrolyzed bacterial cellulose aerogel for current ripple filtering and pulse energy storage." Nano Energy 40 (2017): 107-114.
Jin, So Yeon, et al. "Surface-modified polyethylene separator via oxygen plasma treatment for lithium ion battery." Journal of Industrial and Engineering Chemistry 45 (2017): 15-21.
Kaushik, Madhu, and Audrey Moores. "Nanocelluloses as versatile supports for metal nanoparticles and their applications in catalysis." Green Chemistry 18.3 (2016): 622-637.
Kong, Lushi, et al. "A Janus nanofiber-based separator for trapping polysulfides and facilitating ion-transport in lithium-sulfur batteries." Nanoscale 11.39 (2019): 18090-18098.
Kushima, Akihiro, et al. "Liquid cell transmission electron microscopy observation of lithium metal growth and dissolution: Root growth, dead lithium and lithium flotsams." Nano energy 32 (2017): 271-279.
Lai, Chen, et al. "TEMPO-mediated oxidation of bacterial cellulose in a bromide-free system." Colloid and Polymer Science 291.12 (2013): 2985-2992.
Lee, Jung Tae, et al. "Sulfur-infiltrated micro-and mesoporous silicon carbide-derived carbon cathode for high-performance lithium sulfur batteries." Advanced Materials 25.33 (2013): 4573-4579.
Lei, Tianyu, et al. "Inhibiting polysulfide shuttling with a graphene composite separator for highly robust lithium-sulfur batteries." Joule 2.10 (2018): 2091-2104.
Lemos, Elke MF, Patrícia SO Patrício, and Marivalda M. Pereira. "3D nanocomposite chitosan/bioactive glass scaffolds obtained using two different routes: an evaluation of the porous structure and mechanical properties." Química Nov. 39.4 (2016): 462-466.
Li, Gaoran, et al. "Polysulfide regulation by the zwitterionic barrier toward durable lithium-sulfur batteries." Journal of the American Chemical Society 142.7 (2020): 3583-3592.
Li, Shiqi, and Zhaoyang Fan. "Encapsulation methods of sulfur particles for lithium-sulfur batteries: A review." Energy Storage Materials 34 (2021): 107-127.
Li, Shiqi, et al. "Bacterial cellulose derived carbon nanofiber aerogel with lithium polysulfide catholyte for lithium-sulfur batteries." Carbon 124 (2017): 212-218.
Li, Shiqi, et al. "Carbonized cellulose paper as an effective interlayer in lithium-sulfur batteries." Applied Surface Science 396 (2017): 637-643.
Li, Shiqi, et al. "Confining sulfur species in cathodes of lithium-sulfur batteries: insight into nonpolar and polar matrix surfaces." ACS Energy Letters 1.2 (2016): 481-489.
Li, Shiqi, et al. "Gel based sulfur cathodes with a high sulfur content and large mass loading for high-performance lithium-sulfur batteries." Journal of Materials Chemistry A 5.4 (2017): 1650-1657.
Li, Shiqi, et al. "Recent progress in developing Li2S cathodes for Li-S batteries." Energy Storage Materials 27 (2020): 279-296.
Li, W., et al. "Functionalized bacterial cellulose as a separator to address polysulfides shuttling in lithium-sulfur batteries." Materials Today Energy 21 (2021): 100813.
Li, Wenyue, et al. "3-D edge-oriented electrocatalytic NiCo2S4 nanoflakes on vertical graphene for Li-S batteries." Energy Material Advances (2021).
Li, Yang, et al. "Regulated lithium ionic flux through well-aligned channels for lithium dendrite inhibition in solid-state batteries." Energy Storage Materials 31 (2020): 344-351.
Zhao, Yan, et al. "Dense coating of Li4Ti5O12 and graphene mixture on the separator to produce long cycle life of lithium-sulfur battery." Nano Energy 30 (2016): 1-8.
Zheng, Jianming, et al. "Electrolyte additive enabled fast charging and stable cycling lithium metal batteries." Nature Energy 2.3 (2017): 17012.
Zheng, Yan, et al. "Metal-organic frameworks for lithium-sulfur batteries." Journal of materials chemistry A 7.8 (2019): 3469-3491.
Zhu, Jinguo, et al. "Rational design of graphitic-inorganic Bi-layer artificial SEI for stable lithium metal anode." Energy Storage Materials 16 (2019): 426-433.
Zhu, Xiaobo, et al. "In situ extracted poly (acrylic acid) contributing to electrospun nanofiber separators with precisely tuned pore structures for ultra-stable lithium-sulfur batteries." Journal of Materials Chemistry A 7.7 (2019): 3253-3263.
Zhuang, Ting-Zhou, et al. "Rational integration of polypropylene/graphene oxide/nafion as ternary-layered separator to retard the shuttle of polysulfides for lithium-sulfur batteries." Small 12.3 (2016): 381-389.

(56) References Cited

OTHER PUBLICATIONS

Li, Yiju, et al. "Single atom array mimic on ultrathin MOF nanosheets boosts the safety and life of lithium-sulfur batteries." Advanced Materials 32.8 (2020): 1906722.
Li, Zhe, et al. "A review of lithium deposition in lithium-ion and lithium metal secondary batteries." Journal of power sources 254 (2014): 168-182.
Lin, Haibin, et al. "A cathode-integrated sulfur-deficient Co9S8 catalytic interlayer for the reutilization of "lost" polysulfides in lithium-sulfur batteries." ACS nano 13.6 (2019): 7073-7082.
Liu, Bin, Ji-Guang Zhang, and Wu Xu. "Advancing lithium metal batteries." Joule 2.5 (2018): 833-845.
Liu, Donghai, et al. "Catalytic effects in lithium-sulfur batteries: promoted sulfur transformation and reduced shuttle effect." Advanced science 5.1 (2018): 1700270.
Liu, Fanfan, et al. "A mixed lithium-ion conductive Li2S/Li2Se protection layer for stable lithium metal anode." Advanced Functional Materials 30.23 (2020): 2001607.
Liu, Wen, et al. "Functional metal-organic framework boosting lithium metal anode performance via chemical interactions." Chemical science 8.6 (2017): 4285-4291.
Liu, Xue, et al. "Nanostructured metal oxides and sulfides for lithium-sulfur batteries." Advanced materials 29.20 (2017): 1601759.
Liu, Yangyang, et al. "Dendrite-free lithium metal anode enabled by separator engineering via uniform loading of lithiophilic nucleation sites." Energy Storage Materials 19 (2019): 24-30.
Liu, Yuanming, et al. "Oxygen and nitrogen co-doped porous carbon granules enabling dendrite-free lithium metal anode." Energy Storage Materials 18 (2019): 320-327.
Lizundia, Erlantz, et al. "Cellulose and its derivatives for lithium ion battery separators: A review on the processing methods and properties." Carbohydrate Polymer Technologies and Applications 1 (2020): 100001.
Manthiram, Arumugam, Yongzhu Fu, and Yu-Sheng Su. "Challenges and prospects of lithium-sulfur batteries." Accounts of chemical research 46.5 (2013): 1125-1134.
Miao, R., et al. "A new ether-based electrolyte for dendrite-free lithium-metal based rechargeable batteries." Scientific reports 2016, 6 (1), 1-9.
Moy, Derek, A. Manivannan, and S. R. Narayanan. "Direct measurement of polysulfide shuttle current: a window into understanding the performance of lithium-sulfur cells." Journal of the electrochemical society 162.1 (2015): A1-A7.
Musino, Dafne, et al. "Hydroxyl groups on cellulose nanocrystal surfaces form nucleation points for silver nanoparticles of varying shapes and sizes." Journal of colloid and interface science 584 (2021): 360-371.
Okita, Yusuke, Tsuguyuki Saito, and Akira Isogai. "Entire surface oxidation of various cellulose microfibrils by TEMPO-mediated oxidation." Biomacromolecules 11.6 (2010): 1696-1700.
Pathak, Rajesh, et al. "Ultrathin bilayer of graphite/SiO2 as solid interface for reviving Li metal anode." Advanced Energy Materials 9.36 (2019): 1901486.
Piao, Nan, et al. "Countersolvent electrolytes for lithium-metal batteries." Advanced Energy Materials 10.10 (2020): 1903568.
Rahman, Md Mokhlesur, et al. "High temperature and high rate lithium-ion batteries with boron nitride nanotubes coated polypropylene separators." Energy Storage Materials 19 (2019): 352-359.
Rama, Sidra, et al. "Encapsulation of 2-amino-2-methyl-1-propanol with tetraethyl orthosilicate for CO2 capture." Frontiers of Chemical Science and Engineering 13.4 (2019): 672-683.
Rehman, Sarish, Shaojun Guo, and Yanglong Hou. "Rational Design of Si/SiO2@ Hierarchical Porous Carbon Spheres as Efficient Polysulfide Reservoirs for High-Performance Li-S Battery." Advanced Materials (Deerfield Beach, Fla.) 28.16 (2016): 3167-3172.
Saito, Tsuguyuki, et al. "Cellulose nanofibers prepared by TEMPO-mediated oxidation of native cellulose." Biomacromolecules 8.8 (2007): 2485-2491.
Saito, Tsuguyuki, et al. "Homogeneous suspensions of individualized microfibrils from TEMPO-catalyzed oxidation of native cellulose." Biomacromolecules 7.6 (2006): 1687-1691.
Shafi, Sameera, and Yaping Zhao. "Superhydrophobic, enhanced strength and thermal insulation silica aerogel/glass fiber felt based on methyltrimethoxysilane precursor and silica gel impregnation." Journal of Porous Materials 27.2 (2020): 495-502.
Shaibani, Mahdokht, et al. "Suppressed polysulfide crossover in Li-S batteries through a high-flux graphene oxide membrane supported on a sulfur cathode." ACS nano 10.8 (2016): 7768-7779.
Shen, Kang, et al. "Magnetic field-suppressed lithium dendrite growth for stable lithium-metal batteries." Advanced Energy Materials 9.20 (2019): 1900260.
Shen, Zhurui, et al. "A black-red phosphorus heterostructure for efficient visible-light-driven photocatalysis." Journal of Materials Chemistry A 3.7 (2015): 3285-3288.
Sun, Zixu, et al. "Catalytic polysulfide conversion and physiochemical confinement for lithium-sulfur batteries." Advanced Energy Materials 10.22 (2020): 1904010.
Suriyakumar, Shruti, et al. "Metal-organic framework@ SiO 2 as permselective separator for lithium-sulfur batteries." Journal of Materials Chemistry A 6.30 (2018): 14623-14632.
Tan, Lei, et al. "Lightweight reduced graphene oxide@ MoS2 interlayer as polysulfide barrier for high-performance lithium-sulfur batteries." ACS applied materials & interfaces 10.4 (2018): 3707-3713.
Tian, Yuan, et al. "Micro-spherical sulfur/graphene oxide composite via spray drying for high performance lithium sulfur batteries." Nanomaterials 8.1 (2018): 50.
Tsouko, Erminda, et al. "Bacterial cellulose production from industrial waste and by-product streams." International journal of molecular sciences 16.7 (2015): 14832-14849.
Wang, Chengzhi, et al. "Controlling Li ion flux through materials innovation for dendrite-free lithium metal anodes." Advanced Functional Materials 29.49 (2019): 1905940.
Wang, Yuankun, et al. "Enhancing catalytic activity of titanium oxide in lithium-sulfur batteries by band engineering." Advanced Energy Materials 9.24 (2019): 1900953.
Wang, Zhaohui, et al. "Why cellulose-based electrochemical energy storage devices ?. " Advanced Materials 33.28 (2021): 2000892.
Whittingham, M. Stanley. "Ultimate limits to intercalation reactions for lithium batteries." Chemical reviews 114.23 (2014): 11414-11443.
Wu, Bingbin, et al. "Good practices for rechargeable lithium metal batteries." Journal of The Electrochemical Society 166.16 (2019): A4141-A4149.
Wu, Feng, et al. "Perspectives for restraining harsh lithium dendrite growth: Towards robust lithium metal anodes." Energy Storage Materials 15 (2018): 148-170.
Wu, Heng-Liang, et al. "Thiol-based electrolyte additives for high-performance lithium-sulfur batteries." Nano Energy 32 (2017): 50-58.
Wu, Xian, et al. "Ion-Selective Prussian-Blue-Modified Celgard Separator for High-Performance Lithium-Sulfur Battery." ChemSusChem 11.18 (2018): 3345-3351.
Xu, Shanshan, et al. "Evolution of dead lithium growth in lithium metal batteries: experimentally validated model of the apparent capacity loss." Journal of The Electrochemical Society 166.14 (2019): A3456-A3463.
Yu, Xingwen, et al. "Controlling the polysulfide diffusion in lithium-sulfur batteries with a polymer membrane with intrinsic nanoporosity." Materials today energy 7 (2018): 98-104.
Yu, Xingwen, et al. "Tailoring the pore size of a polypropylene separator with a polymer having intrinsic nanoporosity for suppressing the polysulfide shuttle in lithium-sulfur batteries." Advanced Energy Materials 10.1 (2020): 1902872.
Zahn, Raphael, et al. "Improving ionic conductivity and lithium-ion transference number in lithium-ion battery separators." ACS Applied Materials & Interfaces 8.48 (2016): 32637-32642.
Zhang, Heng, et al. "Electrolyte additives for lithium metal anodes and rechargeable lithium metal batteries: progress and perspectives." Angewandte Chemie International Edition 57.46 (2018): 15002-15027.

(56) References Cited

OTHER PUBLICATIONS

Zhang, Miao, et al. "Adsorption-catalysis design in the lithium-sulfur battery." Advanced Energy Materials 10.2 (2020): 1903008.
Zhang, Sheng S. "Liquid electrolyte lithium/sulfur battery: Fundamental chemistry, problems, and solutions." Journal of Power Sources 231 (2013): 153-162.
Zhang, Sheng Shui. "A review on the separators of liquid electrolyte Li-ion batteries." Journal of power sources 164.1 (2007): 351-364.
Zhang, Xue-Qiang, et al. "Highly stable lithium metal batteries enabled by regulating the solvation of lithium ions in nonaqueous electrolytes." Angewandte Chemie International Edition 57.19 (2018): 5301-5305.
Zhao, Huijuan, et al. "A review on anode for lithium-sulfur batteries: Progress and prospects." Chemical Engineering Journal 347 (2018): 343-365.

* cited by examiner

OXIDIZED BACTERIAL CELLULOSE SEPARATOR FOR BATTERIES AND METHOD FOR PRODUCING THE SAME

RELATED APPLICATIONS

This application claims the benefit of U.S. provisional patent application 63/299,164, filed Jan. 13, 2022 titled "Oxidized Bacterial Cellulose parator for Batteries and Method for Producing the Same," the entirety of the disclosure of which is hereby incorporated by this reference.

STATEMENT REGARDING FEDERALLY SPONSORED RESEARCH

This invention was made with government support under 2103582 awarded by the National Science Foundation. The government has certain rights in the invention.

TECHNICAL FIELD

Aspects of this document relate generally to battery separators.

BACKGROUND

Countless technologies are fueling the demand for batteries that provide more power in a smaller package. Elemental lithium has the highest theoretical specific capacity and the lowest negative potential, making it the most attractive battery anode material. Lithium-metal batteries can deliver an energy density significantly higher than that of lithium-ion batteries. Instead of the conventional graphite anode of lithium-ion batteries, lithium-metal batteries use Li metal as the anode. This Li-metal anode is sometimes matched with a cathode made of conventional oxide materials, but can also be paired with a cathode based on more exotic sulfur and oxygen compounds.

However, the use of a lithium-metal anode introduces a number of problems that need to be overcome before Li-metal batteries are practical for widespread use. A major problem is the formation of lithium dendrites and the associated unstable solid electrolyte interface (SEI) layer. The lithium dendrites can penetrate the battery separator and short out the cathode and anode, raising severe safety concerns. These dendrites also can detach from the anode and form dead lithium after being encapsulated by insulating SEI. Moreover, the dendrite detachments expose fresh lithium to the electrolyte, causing a continuous reaction between lithium and the electrolyte and resulting in fast capacity loss and low Coulombic efficiency during battery operation.

Depending on battery chemistry, the choice of paring cathode may exacerbate these issues by introducing additional side reactions. For example, lithium-sulfur batteries employ sulfur as the cathode material, offering the desirable combination of a large specific capacity and low cost. However, in the stepwise conversion chemistry between $S_8$ and $Li_2S$, many intermittent lithium polysulfide species are formed. Except for the short-chain $Li_2S_2$ and the final product $Li_2S$, the long-chain polysulfide intermediates are highly soluble in currently available ether-based lithium-sulfur battery electrolytes. These intermediates can easily diffuse out of the cathode matrix to the anode side and then be reduced by the lithium metal. The shuttling of these polysulfides between the cathode and the anode gives rise to capacity fading, enhanced corrosion of the lithium anode, and self-discharge.

SUMMARY

According to one aspect, a method for fabricating a separator for a lithium-based battery includes oxidizing cellulose fibrils through a TEMPO oxidation to form oxidized cellulose having carboxylic functional groups, the cellulose being a bacterial cellulose. The method further includes decorating the oxidized cellulose with nanoparticles composed of an oxide material by introducing a precursor solution to the oxidized cellulose that reacts with hydroxyl groups of the oxidized cellulose while preserving the carboxylic functional groups of the oxidized cellulose, causing the nanoparticles to nucleate on the surface of the oxidized cellulose. The method also includes forming the nanoparticle-decorated oxidized cellulose into a film to become the separator for the lithium-based battery.

Particular embodiments may comprise one or more of the following features. The oxide material may be $SiO_2$. The precursor solution may be tetraethyl orthosilicate (TEOS). The oxide material may be one of $TiO_2$, $Ti_4O_7$, ZnO, $Al_2O_3$, $MoO_3$, $V_2O_5$, $VO_2$, $V_2O_3$, H-doped $VO_2$, $MnO_2$, $SnO_2$, NiO, $ZnAl_2O_4$, ZnMgO, and $BaTiO_3$. The lithium-based battery may be one of a lithium-metal battery and a lithium-sulfur battery.

According to another aspect of the disclosure, a method for fabricating a separator for a lithium-based battery includes oxidizing cellulose fibrils to form oxidized cellulose having carboxylic functional groups, decorating the oxidized cellulose with nanoparticles, and forming the nanoparticle-decorated oxidized cellulose into a film to become the separator for the lithium-based battery.

Particular embodiments may comprise one or more of the following features. The cellulose may be a bacterial cellulose. The cellulose fibrils may be oxidized through a TEMPO oxidation. Decorating the oxidized cellulose with nanoparticles may include introducing a precursor solution to the oxidized cellulose that reacts with hydroxyl groups of the oxidized cellulose while preserving the carboxylic functional groups, causing the nanoparticles to nucleate on the surface of the oxidized cellulose. The nanoparticles may be composed of an oxide material. The oxide material may be $SiO_2$. The precursor solution may be tetraethyl orthosilicate (TEOS). The oxide material may be one of $TiO_2$, $Ti_4O_7$, ZnO, $Al_2O_3$, $MoO_3$, $V_2O_5$, $VO_2$, $V_2O_3$, H-doped $VO_2$, $MnO_2$, $SnO_2$, NiO, $ZnAl_2O_4$, ZnMgO, and $BaTiO_3$. The nanoparticles may be composed of a nitride material. The nitride material may be one of AlN, TIN, VN, and O-doped VN. The nanoparticles may be composed of a sulfide material. The sulfide material may be one of $TiS_2$, $MoS_2$, $NiCo_2S_4$, $NiCo_2(O—S)_4$, $V_2S_5$, and O-doped $Sb_2S_3$. The nanoparticles may be composed of a single atom catalyst based on one of as Fe, V, Mo, Co, Ti, and Ge. The lithium-based battery may be a lithium-metal battery. The lithium-based battery may be a lithium-sulfur battery.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DETAILED DESCRIPTION

Figure 1:
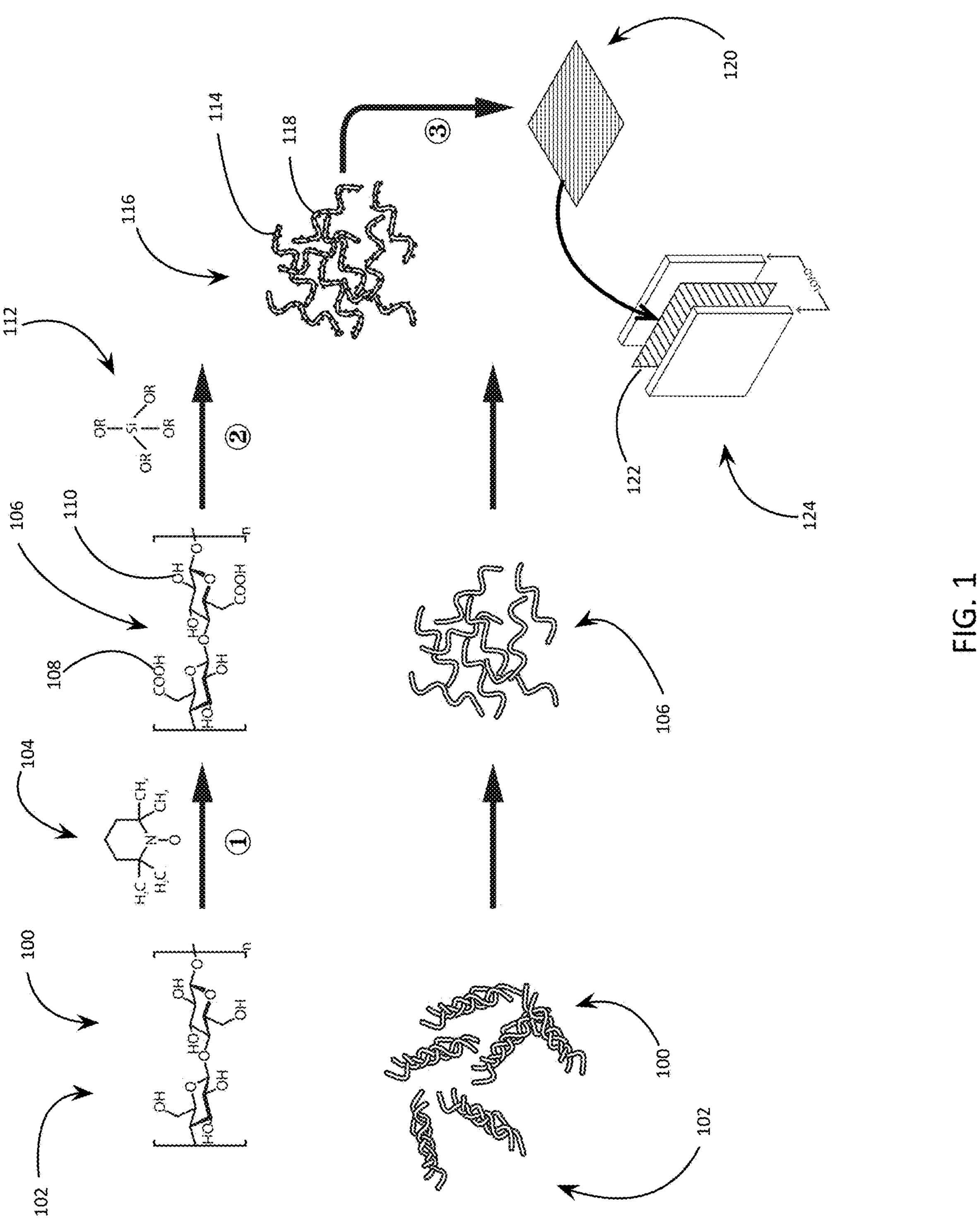
FIG. 1 is a schematic view of a process for producing a separator composed of oxidized bacterial cellulose decorated with $SiO_2$ nanoparticles.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Countless technologies are fueling the demand for batteries that provide more power in a smaller package. Elemental lithium has the highest theoretical specific capacity (3861 mAh $g^{-1}$) and the lowest negative potential (−3.04 V vs. standard hydrogen electrode), making it the most attractive battery anode material. Lithium-metal batteries can deliver an energy density significantly higher than that of lithium-ion batteries. Instead of the conventional graphite anode of lithium-ion batteries, lithium-metal batteries use Li metal as the anode. This Li-metal anode is sometimes matched with a cathode made of conventional oxide materials, but can also be paired with a cathode based on more exotic sulfur and oxygen compounds.

However, the use of a lithium-metal anode introduces a number of problems that must be overcome before Li-metal batteries are practical for widespread use. A major problem is the formation of lithium dendrites and the associated unstable solid electrolyte interface (SEI) layer. The lithium dendrites can penetrate the battery separator and short out the cathode and anode, raising severe safety concerns. These dendrites also can detach from the anode and form dead lithium after being encapsulated by insulating SEI. Moreover, the dendrite detachments expose fresh lithium to the electrolyte, causing a continuous reaction between lithium and the electrolyte and resulting in fast capacity loss and low Coulombic efficiency during battery operation.

Depending on battery chemistry, the choice of paring cathode may exacerbate these issues by introducing additional side reactions. For example, lithium-sulfur batteries employ sulfur as the cathode material, offering the desirable combination of a large specific capacity (1675 mAh $g^{-1}$) and low cost. However, in the stepwise conversion chemistry between $S_8$ and $Li_2S$, many intermittent lithium polysulfide species are formed. Except for the short-chain $Li_2S_2$ and the final product $Li_2S$, the long-chain polysulfide intermediates are highly soluble in the currently available ether-based lithium-sulfur battery electrolyte. These intermediates can easily diffuse out of the cathode matrix to the anode side and then be reduced by the lithium metal. The shuttling of these polysulfides between the cathode and the anode gives rise to capacity fading, enhanced corrosion of the lithium anode, and self-discharge.

A number of different strategies have been suggested to minimize or eliminate the formation of these problematic lithium dendrites. Dendrite formation is correlated to a large local Li+ flux density. Therefore, for a given nominal charging current density, reduction of the Li+ flux density by the adoption of 3D anode structures, or elimination of localized high flux "hot spots" by homogenizing Li+ flux are two potentially useful strategies. Other approaches include establishing a stable SEI layer on lithium metal surface, constructing functional layers on lithium to shield its side-reactions, and/or changing the electrolyte chemistry. Specific examples include, but are not limited to, using new solvent systems such as ether-based systems and ionic liquids which possess better compatibility with lithium metal, adding additives to facilitate the formation of robust SEI via additive self-decomposition or its interaction with Li anode, constructing artificial SEI by directly coating an ionic conductive layer on Li metal, introducing 3D lithium hosts to reduce the flux concentration, providing lithium nucleation sites and regulating lithium deposition process, and fabricating a functionalized separator to facilitate the Li+ transfer and Li redeposition process. Unfortunately, these strategies tend to be complicated and/or will require processes that will not bring lithium-sulfur batteries any closer to being commercially viable for widespread use.

Of the aforementioned approaches, functionalizing the separator is appealing for its relative simplicity. Separator engineering can address the Li dendrite issues associated with the Li metal anode. It also can curb the polysulfides shuttling effect and resulting self-discharging of the battery. However, building this kind of multi-functionalized separator is quite challenging due to the complicated structures and synthesis methods involved.

Contemplated herein is an oxidized bacterial cellulose separator that has been functionalized with nanoparticles to serve as a separator for lithium-based (e.g., Li-metal batteries, Li-sulfur batteries, etc.). The contemplated oxidized bacterial cellulose separator with nanoparticles has been shown to generate a smooth Li+ flux and regulate the Li deposition, while also curbing the polysulfide shuttling process. Advantageous over conventional battery separators, the contemplated separator can run at much higher temperatures.

According to various embodiments, the contemplated separator comprises bacterial cellulose (BC) decorated with nanoparticles, such as non-metal and metal oxides. The intrinsic function of the separator is to isolate the active materials of the cathode and the anode. Natural polymers, particularly cellulose, have attracted attention for use as battery separators because of their good mechanical properties, outstanding thermal and chemical stability, excellent wettability, and low cost. For battery separators, bacteria cellulose (BC) is superior to plant-derived celluloses because the higher purity and better crystallinity of BC vests it with superior mechanical, thermal, and chemical properties.

The dense O-containing moieties of BC enable the formation of non-metal or metal oxide nanoparticles on the BC nanofibers. According to various embodiments, strong interaction between Li+ and the nanoparticles (or BC) facilities the homogenization of the Li+ flux, stabilizing lithium stripping/plating. In some embodiments, oxygen-related bonds also effectively absorb polysulfide species, suppressing the shuttling process. As will be discussed below, the performance of various specific, non-limiting examples of the separator contemplated herein have been experimentally verified to be superior to conventional separators (e.g., Celgard 2400, etc.) and pristine, non-oxidized bacterial cellulose.

It should be noted that while the following disclosure is done in the context of an oxidized BC separator decorated with $SiO_2$ nanoparticles (hereinafter "o-BC/$SiO_2$ separator" or "separator"), other embodiments may utilize different materials for the nanoparticles, such as metal and non-metal oxides. These materials include, but are not limited to, $TiO_2$, $Ti_4O_7$, ZnO, $Al_2O_3$, $MoO_3$, $V_2O_5$, $VO_2$, $V_2O_3$, H-doped $VO_2$, $MnO_2$, $SnO_2$, NiO, as well as $ZnAl_2O_4$, ZnMgO, $BaTiO_3$ and other transition metal oxides. In addition to nanoparticles, in some embodiments, other nanoscale structures and architectures may be utilized including, but not limited to, nanowires, nanofibers, and/or nanorods of $TiO_2$, ZnO and other materials. Metal nitrides, sulfides, phosphides, and their alloys, such as TIN, VN, AlN, $TiS_2$, $MoS_2$, $NiCo_2S_4$, $NiCo_2(O—S)_4$, $V_2S_5$, CoP, O-doped $Sb_2S_3$, O-doped VN, O-doped CoP, may also be used in some embodiments. Transition metal such as Fe, V, Mo, Co, Ti, and Ge, based single atom catalysts, may also be used in some embodiments.

In still other embodiments, the separator may be coated with polydopamine (PDA). In a specific embodiment, 20-30 g of bacterial cellulose (BC) sheet may be impelled in 100 mL of DI water to form a dispersed BC nanofiber suspension. Polydopamine hydrochloride (i.e., 2 $gL^{-1}$) and 10 mM tris-HCl solution (i.e., pH=8) may then be used for functionalizing the BC. It may be added to the cellulose solution under vigorous stirring and left for 24 hours, for PDA polymerization.

Furthermore, while some embodiments utilize bacterial cellulose, it should be noted that other plant cellulose-based fibrils may also be used, according to various embodiments. The contemplated methods for fabricating the contemplated o-BC separator comprising nanoparticles may be adapted for nanoparticles of other nonmetal or metal oxides/sulfide materials, which may also be introduced uniformly onto the BC fibers, leading to better structure and composition for the separator for use in various batteries, including but not limited to Li-metal and Li-sulfur batteries.

Figure 2:
FIG. 2 is a flowchart for a method for producing a composite film composed of oxidized cellulose decorated with nanoparticles.
Figure 2:
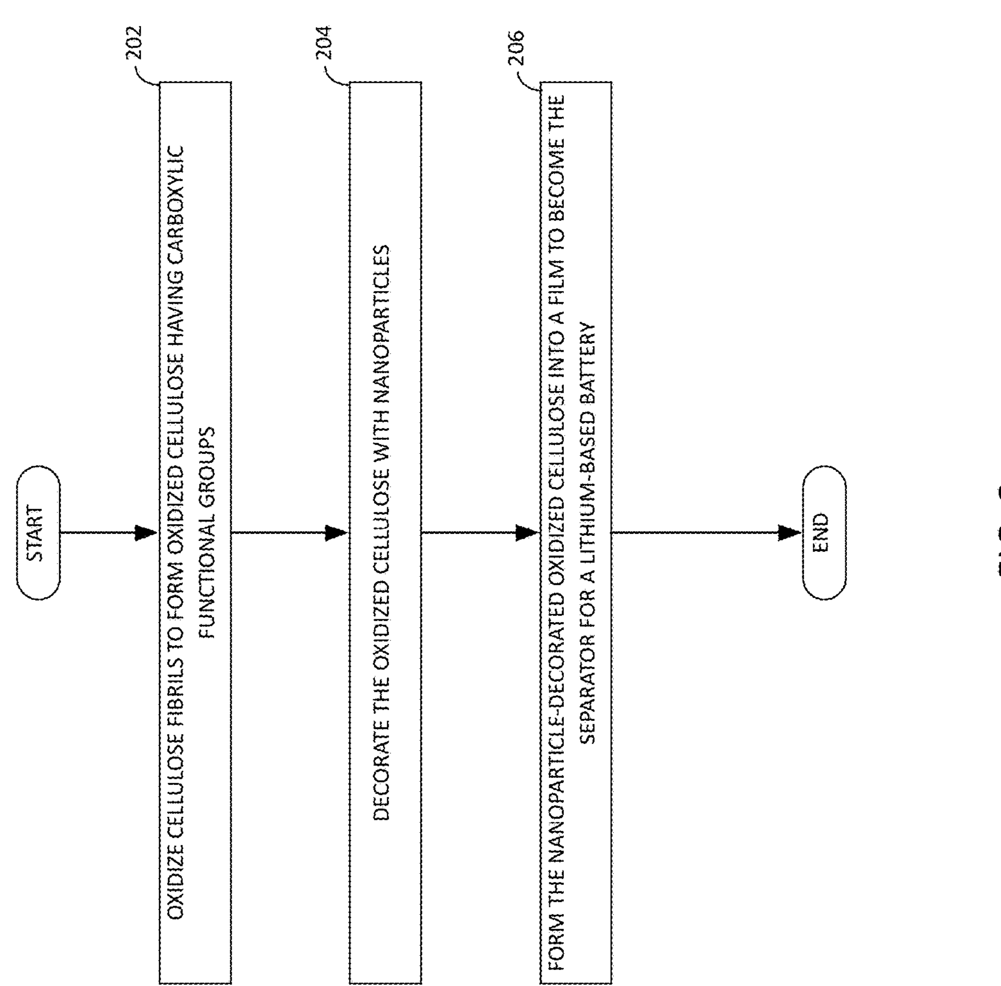

FIG. 1 shows a schematic depiction of a non-limiting example of a method for producing a specific embodiment of the contemplated separator 122. Specifically, FIG. 1 shows the process for producing a composite film 120 composed of bacterial cellulose 102 that has been oxidized and decorated with $SiO_2$ nanoparticles 114. FIG. 2 shows a flowchart for a method 200 for producing various embodiments of the contemplated separator 122 including, but not limited to, the o-BC/$SiO_2$ separator 122 shown in FIG. 1.

First, cellulose fibrils 100 are oxidized to form oxidized cellulose 106 having carboxylic functional groups 108 (step 202). See 'circle 1' of FIG. 1. In some embodiments, including the non-limiting example shown in FIG. 1, the cellulose 100 is a bacterial cellulose 102. In some embodiments, the bacterial cellulose 102 begins in pellicle form, and may be produced via a fermentation process, as is known in the art. In a specific embodiment, the BC pellicles are subsequently washed in DI water, then boiled in 0.5 M KOH solution for 1 hour to remove impurities. The purified pellicles are then washed in DI water again until a pH of ~7.0 is attained. In other embodiments, the bacterial cellulose 102 may be sourced in a different form or in a different process. In still other embodiments, other cellulose 100 may be used.

The more dispersed the cellulose fibrils 100 are in solution, the more uniform the decoration of the fibrils 100 with nanoparticles 114 will be. In some embodiments, the purified BC pellicles may be minced into a pulp prior to oxidation. According to various embodiments, the cellulose fibrils 100 (e.g., pulped bacterial cellulose 102, etc.) may be oxidized through exposure to 2,2,6,6-tetramethylpiperidine-1-oxyl (TEMPO), as shown in 'circle 1' of FIG. 1. The TEMPO oxidation process serves to selectively convert the $C_2$-hydroxyl functional groups of the cellulose fibrils 100 into carboxylic functional groups 108. The TEMPO oxidation process can also partly hydrolyze the thick fibrils into microfibrils, resulting in better dispersion in water and ethanol. In other embodiments, other oxidation processes and solutions may be used; the process used depends, in part, on the nature of the cellulose 100 being oxidized.

In a specific, non-limiting example, 30 g of pulped bacterial cellulose 102 is first dispersed into 100 mL of DI water under strong stirring, and then 0.016 g of TEMPO 104 and 0.1 g of NaBr are added into the solution, sequentially. After they have dissolved completely, 5 mL of 12% NaClO solution is added dropwise into the mixture. During the reaction process, the solution's pH may be adjusted with 0.5 M NaOH to roughly 10. The oxidation reaction is carried out for 5 hours and then quenched by pouring 5 mL of ethanol directly into the solution. The oxidized bacterial cellulose 106 (hereinafter "o-BC") is then collected via centrifuge. Continuing with the specific, non-limiting example, the collected o-BC 106 is then washed using 0.5 M HCl solution, DI water, and ethanol until the pH reaches 7.0. Because of the large carboxylic functional group 108 concentration, the collected o-BC 106 may be homogeneously dispersed into ethanol or DI water, according to various embodiments.

Next, the oxidized cellulose 106 (e.g., o-BC 106, etc.) is decorated or functionalized with nanoparticles 114 (step 204). See 'circle 2' of FIG. 1. According to various embodiments, the distribution of the nanoparticles 114 can be significantly improved after introducing extrinsic functional groups (i.e., carboxylic functional groups 108, etc.) on the o-BC 106 as a result of the interaction between the functional groups and nanoparticle precursors (i.e., precursor solution 112), as well as thinner bacterial cellulose fiber diameters. As shown schematically in FIG. 1, this mechanism can be used to produce evenly distributed nanoparticle-modified bacterial cellulose composites, hereinafter referred to as decorated cellulose 116, where the precursor solution 112 will react with the hydroxyl groups 110 and cause nanoparticles 114 to nucleate on the surface 118 of the oxidized cellulose nanofibrils 106, while the carboxylic functional groups 108 are preserved. Advantageously, these preserved carboxylic functional groups 108 serve as another polysulfide shuttling barrier because of the direct repulsive interaction between the carboxylic functional groups 108 and problematic polysulfides.

As previously mentioned, in some embodiments, the nanoparticles 114 may be composed of one or more oxide materials. Examples include, but are not limited to, $SiO_2$, $TiO_2$, ZnO, $Al_2O_3$, $MoO_3$, $V_2O_5$, $SnO_2$, NiO, $ZnAl_2O_4$, ZnMgO, and $BaTiO_3$. As shown in FIG. 1, in a specific embodiment the nanoparticles 114 may be composed of $SiO_2$, created through the introduction of tetraethyl orthosilicate (TEOS) as the precursor solution 112. In other embodiments, the nanoparticles 114 may be composed of a nitride material including, but are not limited to, AN. In still other embodiments, the nanoparticles 114 may be composed of a sulfide material. Examples include, but are not limited to, $TiS_2$ and $V_2S_5$.

Benefiting from the oxidation process implemented on the pristine bacterial cellulose 102, the introduced carboxylic functional groups 108 effectively modify the nanoparticle 114 growth process, advantageously resulting in a uniform coating on the o-BC 106. In a specific, non-limiting example, the formation of $SiO_2$ nanoparticles 114 begins with dissolving 400 μL of TEOS into 50 mL of an ethanol solution of o-BC 106. After stirring for thirty minutes, 1.0 mL of ammonium hydroxide is added dropwise into the mixture. The resulting decorated cellulose 116 (i.e., the o-BC/$SiO_2$ composite) is collected via centrifuge, and then washed sequentially with DI water and ethanol, and then dispersed into 50 mL of ethanol. The decorated cellulose 116 is then separated by filtrating 25 mL of the above mixture through a PTFE membrane (e.g., 44 mm diameter with a 0.22 μm pore size).

After the nanoparticles 114 are formed, the resulting decorated cellulose 116 material is formed into a composite film 120 (step 206) to become the separator 122 for the lithium-based battery 124. See 'circle 3' of FIG. 1. In a specific, non-limiting example, the material may be sandwiched between two glass slides and then dried in a vacuum oven at 80° C. for twelve hours. The resulting o-BC/$SiO_2$ composite film 120 has controllable thickness in the range of 5-50 micrometers, according to various embodiments. Other embodiments may employ other processes known in the art for fabricating thin films from fibril-like materials.

As previously mentioned, the resulting film 120 is advantageous for use as a separator 122 in a lithium-based batteries 124 including, but not limited to, lithium-metal batteries and lithium-sulfur batteries.

The following discussion explores the performance and characterization of a specific, non-limiting embodiment, specifically the o-BC/$SiO_2$ embodiment discussed above. However, it is important to note that other embodiments may employ different cellulose 100 and/or different materials for the nanoparticle 114 or other nanoscale structures decorating the oxidized cellulose 106. The following discussion focused on the characterization and properties of a specific embodiment using bacterial cellulose 102 and $SiO_2$ nanoparticles 114 derived from TEOS should not be interpreted as a limitation on the range of alternative embodiments. The separators and methods contemplated herein may be adapted for use with other types of batteries and/or materials, according to various embodiments.

Figure 3A:
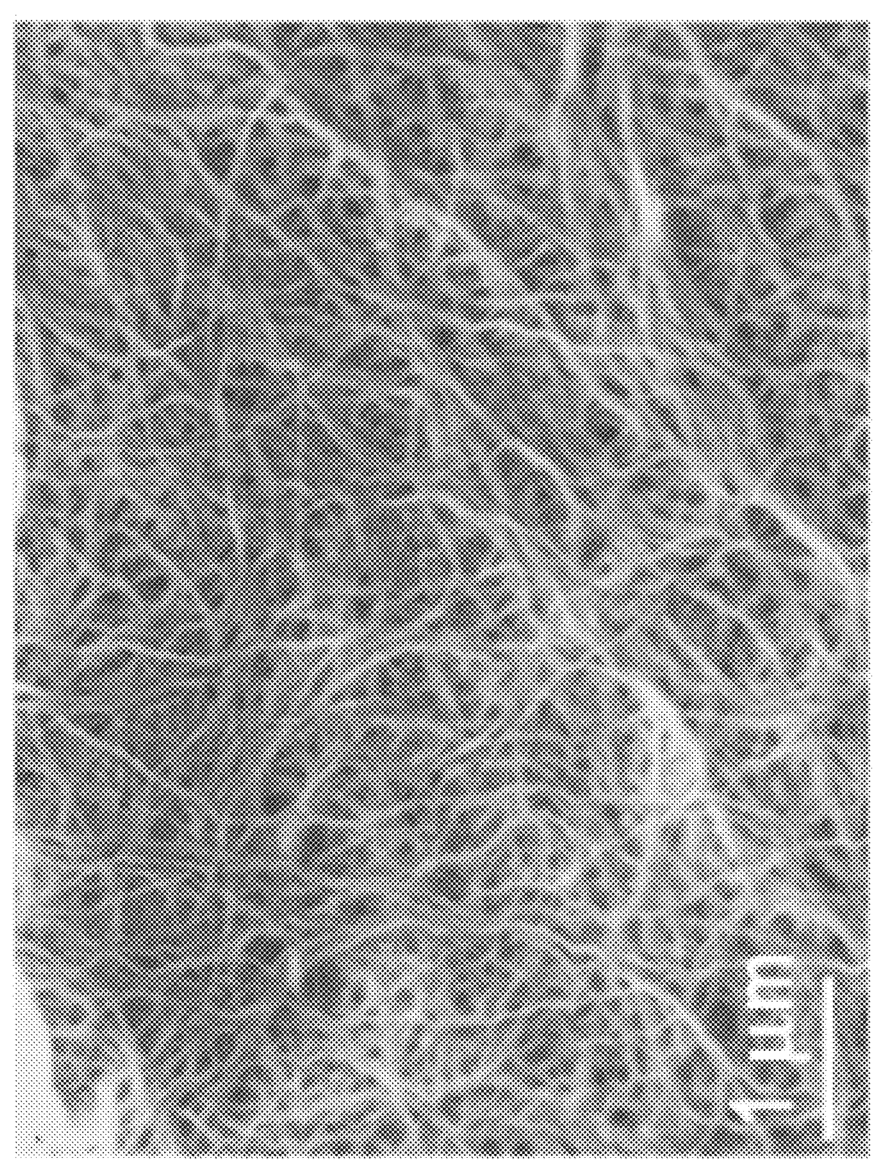
FIG. 3A is a SEM image of a specific embodiment of oxidized bacterial cellulose.
Figure 3B:
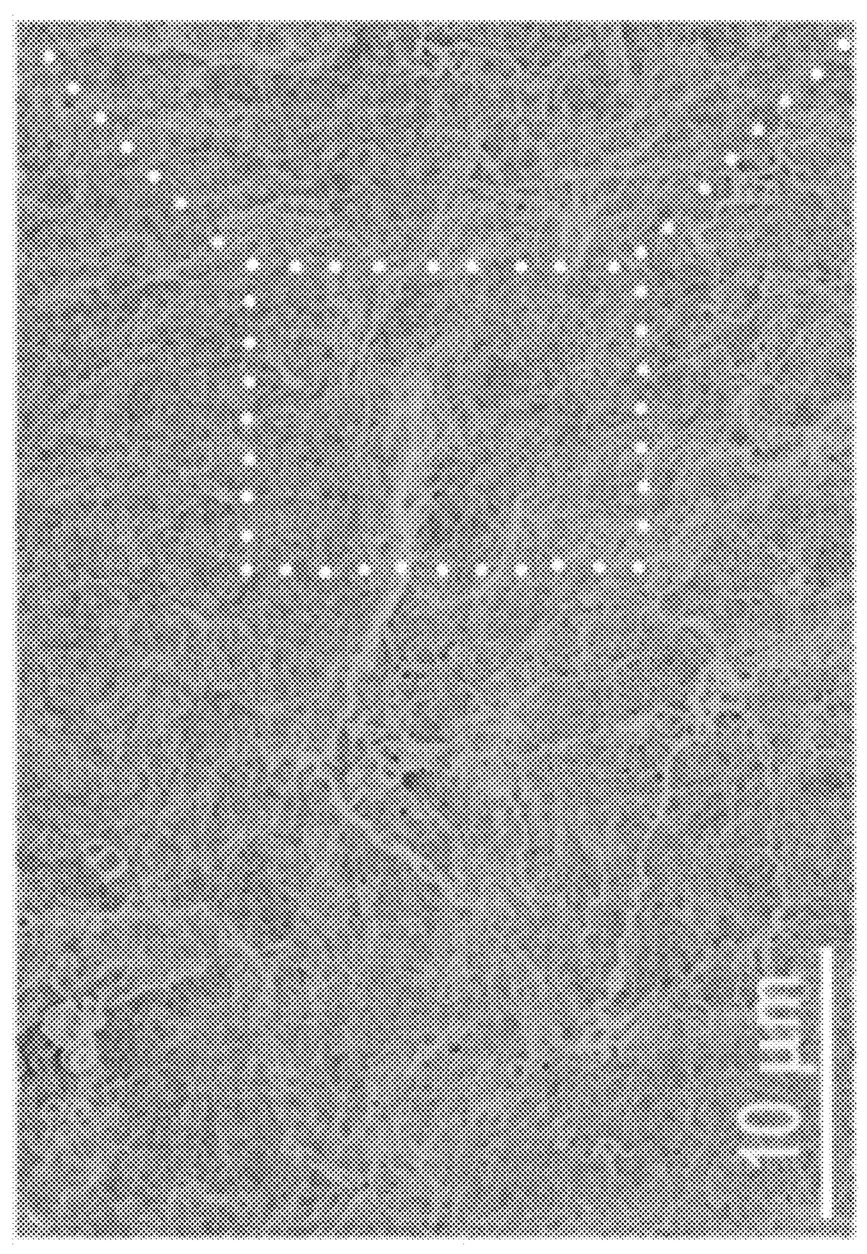
FIGS. 3B and 3C are SEM images of the o-BC of FIG. 3A after decoration with $SiO_2$ nanoparticles.
Figure 3C:
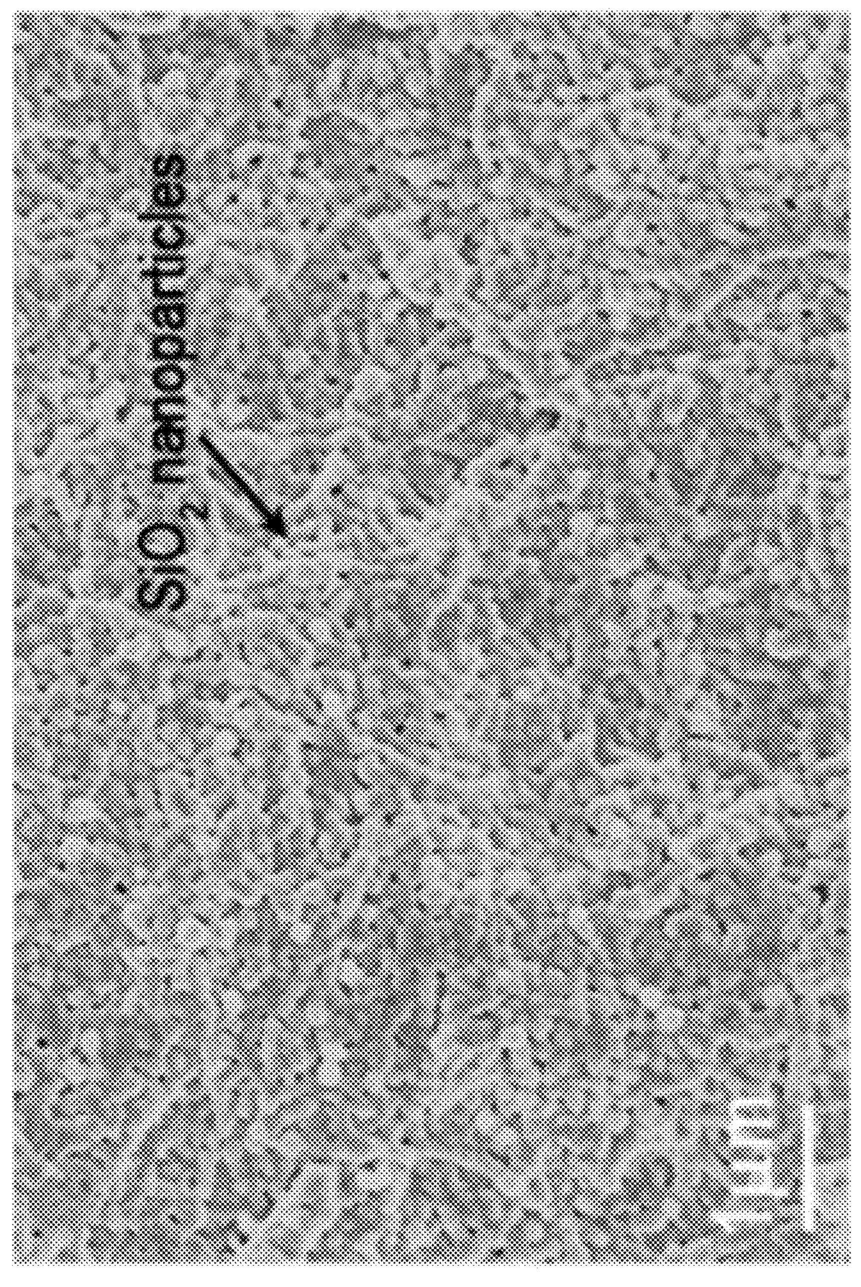

As will be discussed below, for the purposes of characterization in a specific embodiment, the same process was used to prepare an o-BC film without $SiO_2$ nanoparticles 114. FIG. 3A is a SEM image of a specific embodiment of o-BC 106. The crosslinked structure guarantees the flexibility of the resulting thin film. As shown in FIGS. 3B and 3C (SEM images of o-BC/$SiO_2$), the ~100 nm $SiO_2$ nanoparticles 114 uniformly decorate the bacterial cellulose 102 nanofibrils in this specific non-limiting example.

Samples of the specific, non-limiting example of the contemplated o-BC/$SiO_2$ film (i.e., the decorated cellulose 116 of FIG. 1) described above were fabricated using the disclosed process, as well as samples of o-BC 106 without the nanoparticles 114, for the purposes of testing and characterization. The following is a discussion of the characterization and performance of that specific embodiment, and should not be construed to be a limitation of either the characterization methods, or the actual characteristics and/or performance of other embodiments of the contemplated o-BC/$SiO_2$ battery separator. Those skilled in the art will recognize that the tests and measurements discussed below may be performed in other ways, as is known in the art.

Samples of the specific embodiment of the contemplated separator film 120 were synthesized. The morphological features of the samples were studied using a field emission scanning electron microscope (i.e., FEI XL 30 FE-SEM). X-ray diffraction patterns of the samples were recorded using a Rigaku MiniFlex 6G diffractometer equipped with a Cu-Kα radiation source. Differential scanning calorimetry was conducted on a LAB SYS EVO instrument. To measure the Li+ ionic conductivity in a separator 122, it was first soaked in the blank electrolyte (1 M LiTFSI in 1:1 DOL/DME solution), and then sandwiched between two stainless steel spacers and sealed in a coin cell.

Electrochemical impedance spectroscopy (EIS) testing was performed to obtain the resistance, and the ionic conductivity was calculated by using the equation $$\sigma = \frac{l}{RS},$$

where l is the thickness of the separator 122, R is the resistance read from Nyquist plot, and S is the area of the separator 122. The transference number $t^+$ was calculated using the equation $t^+=I_s(V-I_oR_o)/[I_o(V-I_sR_s)]$, where V is the applied DC voltage (10 mV), $I_o$ and $I_s$ are the initial and steady-state currents, respectively, which are read from the Chronoamperometry curves. $R_o$ and $R_s$ are the interfacial resistances before and after DC polarization, respectively, which are obtained from EIS curves.

Li//Li symmetric coin-type cells (e.g., CR2400) were fabricated by employing lithium plates as both the positive and the negative electrodes, using a conventional separator (i.e., Celgard 2400, hereinafter C-2400) in some and the BC-based film 120 as the separator 122 in others. The cell electrolyte for this specific embodiment is made with 1 M bis(trifluoromethane)sulfonamide lithium salt (LiTFSI) dissolved in a 1:1 v/v % mixture of 1,3-dioxolane (DOL)/dimethylethane (DME) solution with 1 wt % $LiNO_3$. Cyclic voltammetry (CV) and EIS (i.e., 0.1-100 kHz with an AC voltage amplitude of 10 mV) tests were carried out on a Bio-logic SP-150 electrochemical workstation. The lithium stripping and plating cycling were recorded on a battery tester (i.e., LANHE, CT2001A). Li//Cu asymmetric cells were also characterized using a similar configuration, except a Cu foil was used for the positive electrode.

Figure 3D:
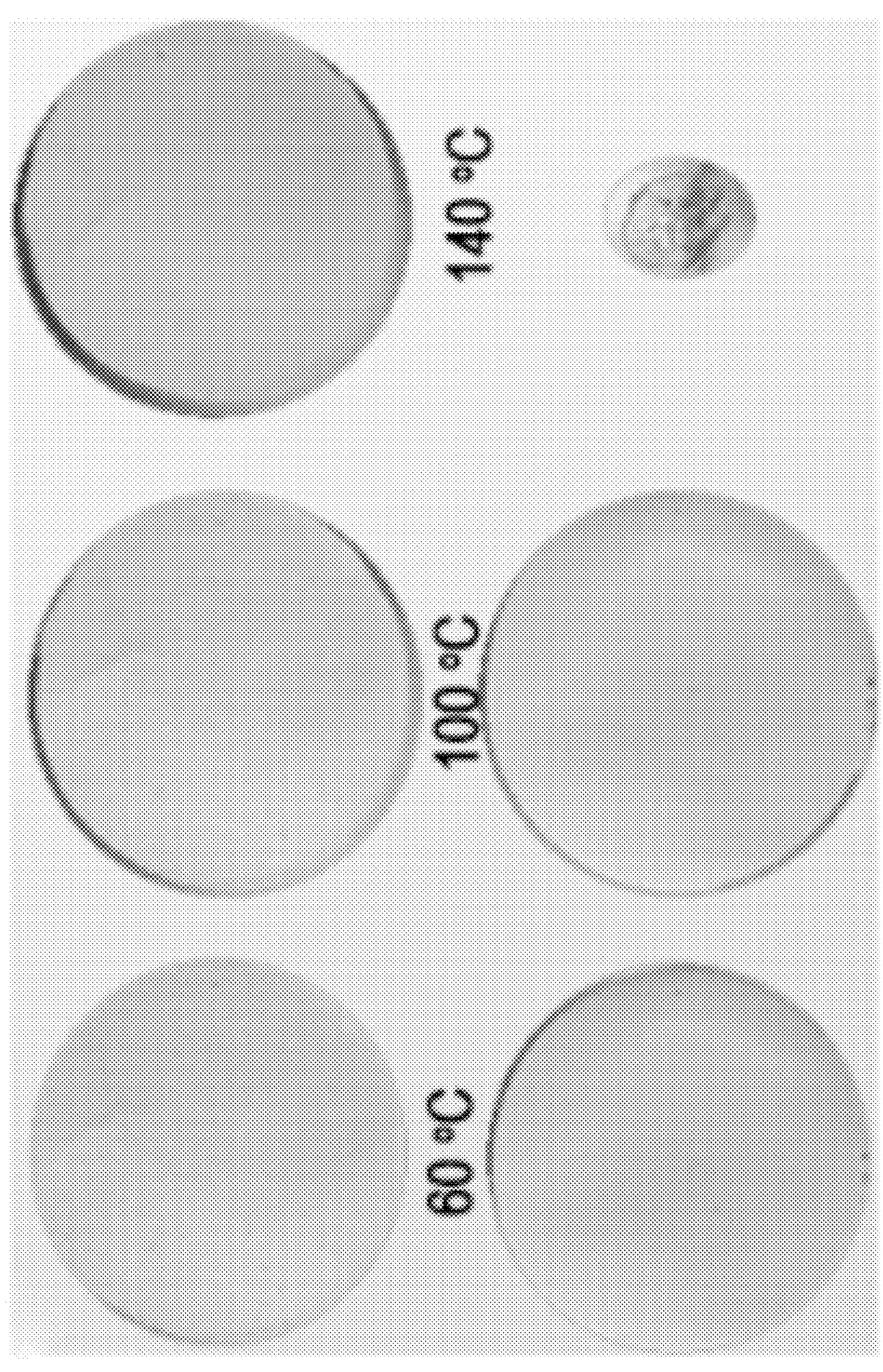
FIG. 3D shows the results of heating of decorated and undecorated oxidized bacterial cellulose films to different temperatures to demonstrate thermal stability.

Safe operation at high temperatures is a crucial requirement of the battery separator. The commercial Celgard membranes can only endure a temperature up to −120° C. before dangerous fault modes become prevalent during operation. The o-BC-based films were tested at elevated temperatures in an oven and the results are exhibited in FIG. 3D. Specifically, FIG. 3D provides a thermal stability comparison between o-BC/$SiO_2$ (the top line) and C-2400. The o-BC 106 (not shown) and o-BC/$SiO_2$ films maintain structural integrity (i.e., shape and dimensions) when the temperature reaches 140° C. while the commercial C-2400 separator film melts at this temperature. To quantitatively characterize the chemical changes at elevated temperatures, a differential scanning calorimetry (DSC) method was used. The C-2400 separator shows a large endothermic peak located at ~150° C., which is attributed to the polypropylene melting. In contrast, the BC-based polymer films endured temperatures as high as ~350° C. before evidence for melting or decomposition was observed. These results suggest that the incorporation of bacterial cellulose 102 in batteries could enable safe operation at much higher temperatures than can be achieved with the current C-2400 separator, according to various embodiments.

Figure 3E:
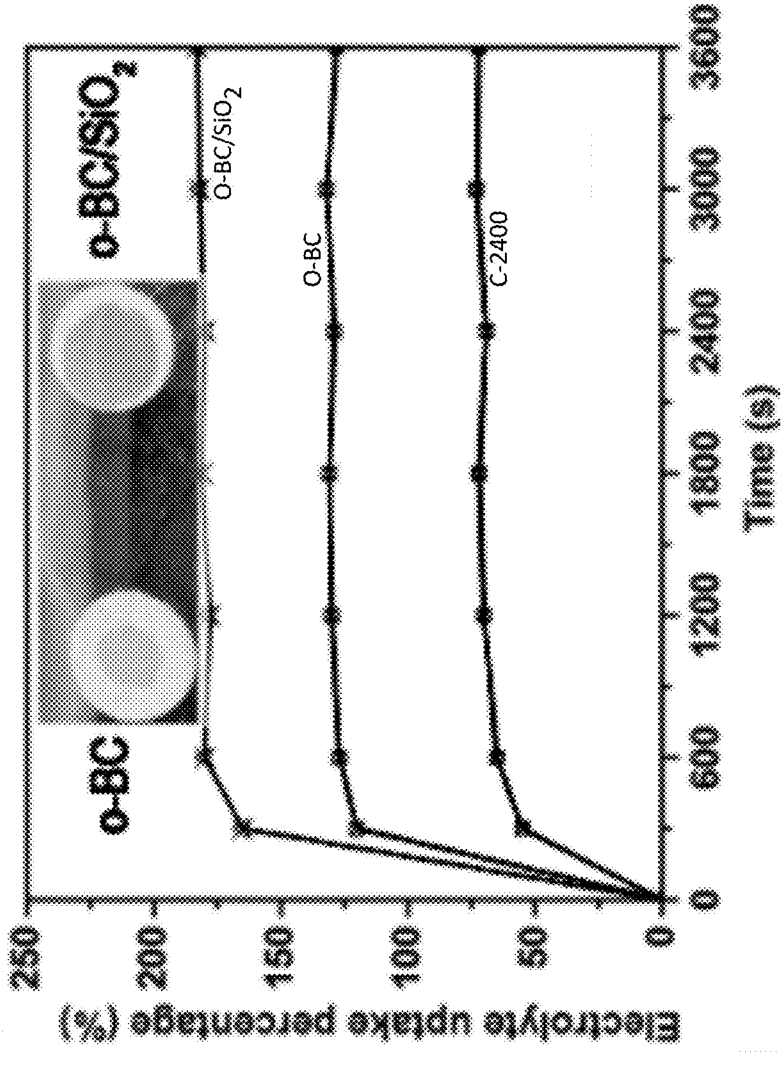
FIG. 3E shows the electrolyte uptake capacity and the electrolyte wettability of decorated and undecorated oxidized bacterial cellulose.

The electrolyte wettability and electrolyte uptake capacity are also key parameters used to access the potential of a film 120 for use as a battery separator 122. As shown in FIG. 3E, both o-BC 106 (i.e., a 25 μm thick o-BC film) and o-BC/$SiO_2$ 116 (i.e., a 30 μm thick o-BC/$SiO_2$ film) films absorb more electrolyte than C-2400 (i.e., a 25 μm thick C-2400 film). A further advantage is that the wettability of o-BC 106 can be improved significantly after being composited with $SiO_2$ nanoparticles 114 (see inset of FIG. 3E).

Figure 3F:
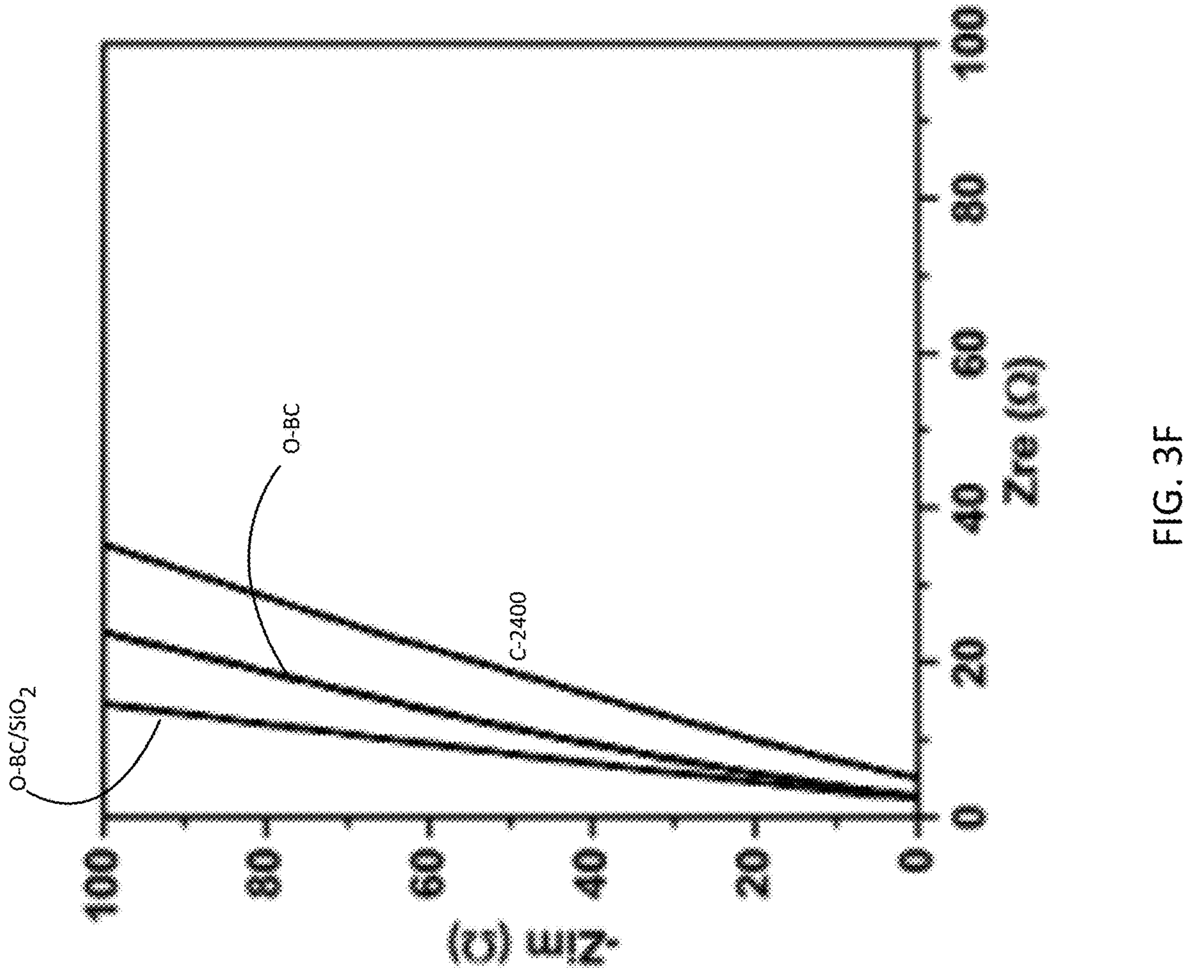
FIGS. 3F and 3G show Nyquist plots and I-t curves for different separator films.
Figure 3G:
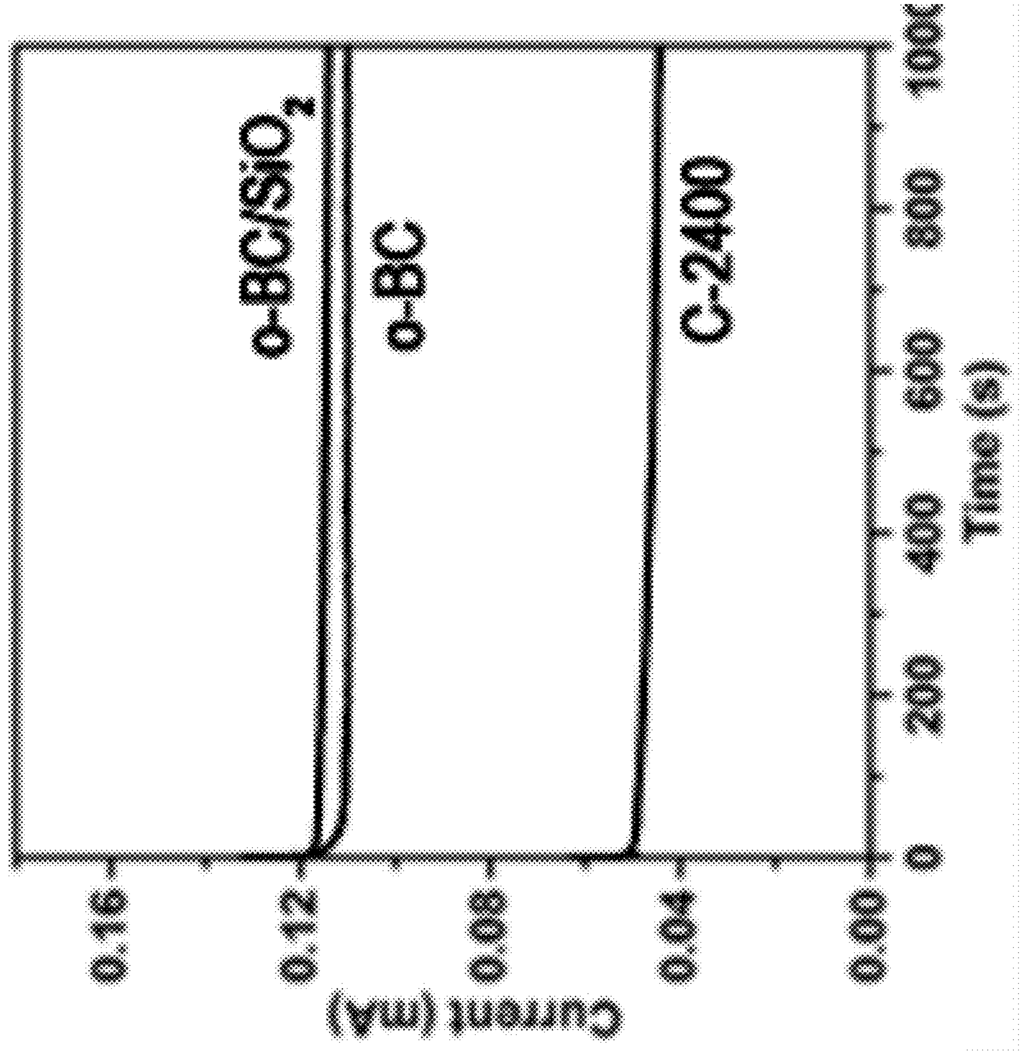

The Li+ ionic conductivity and transference number were also measured. The experimental results are presented in FIG. 3F (Nyquist plots), and FIG. 3G (I-t curves for the three different separator films). Separators 122 with surface functional groups such as oxygen- or nitrogen-containing groups have stronger binding energy to Li+ (e.g., binding energy between carbonyl and Li+ is ~3.08 eV) than bare separators. The Li+ conductivities through o-BC 106 (0.36 mS $cm^{-1}$) and o-BC/$SiO_2$ 116 (0.39 mS $cm^{-1}$) films 120 are higher than through C-2400 (0.23 mS $cm^{-1}$). This results from the high Li+ affinity provided by the oxygen functional groups to both o-BC 106 and $SiO_2$. Even though the Li+ transference number of o-BC 106 based films (0.63 for the o-BC/$SiO_2$ 116 film and 0.65 for the o-BC 106 one) is smaller than that of C-2400, they are still of sufficient magnitude to make useful separators of lithium-metal batteries.

Figure 4A:
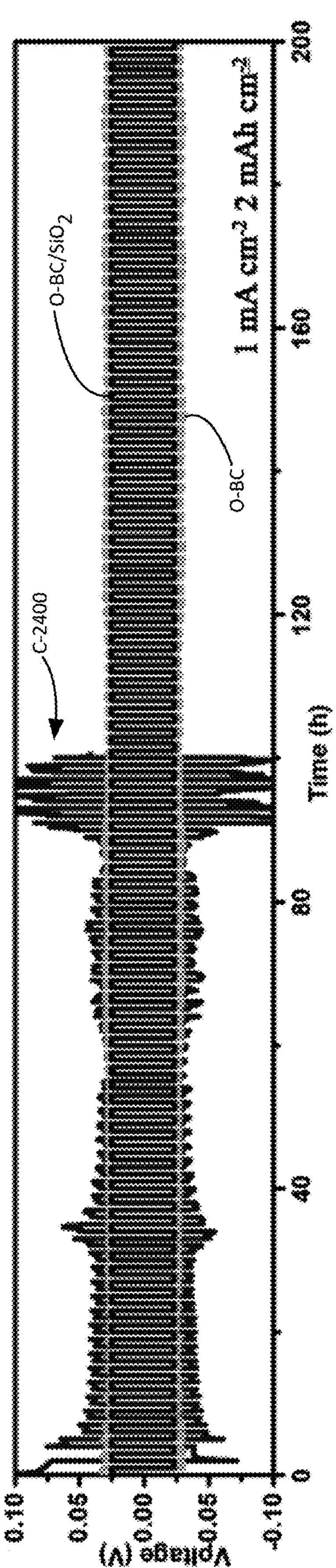
FIG. 4A is a voltage over time plot showing the Li plating and striping result when cycling three different separator films in symmetric Li//Li cells.

These samples of the specific embodiment discussed above were also characterized in the context of lithium stripping and plating. Galvanostatic cycling of Li//Li symmetric cells was performed to compare the Li stripping and plating efficiency of the commercial C-2400 with the o-BC 106 based separators. A cutoff potential of 120 mV was pre-set. The specific capacity was fixed to 2 mAh $cm^{-2}$ and the charge-discharge current density to 1 mA $cm^{-2}$. The cells with o-BC 106 and o-BC/$SiO_2$ 116 separators exhibited very low polarization voltages (~27 and ~25 mV, respectively) and stable cycling performance over 200 hours of testing (see FIG. 4A). In contrast, the cell using a C-2400 separator suffered from a higher polarization voltage (~46 mV), which further increased to the pre-set cutoff potential of 120 mV after only 90 hours.

Figure 4B:
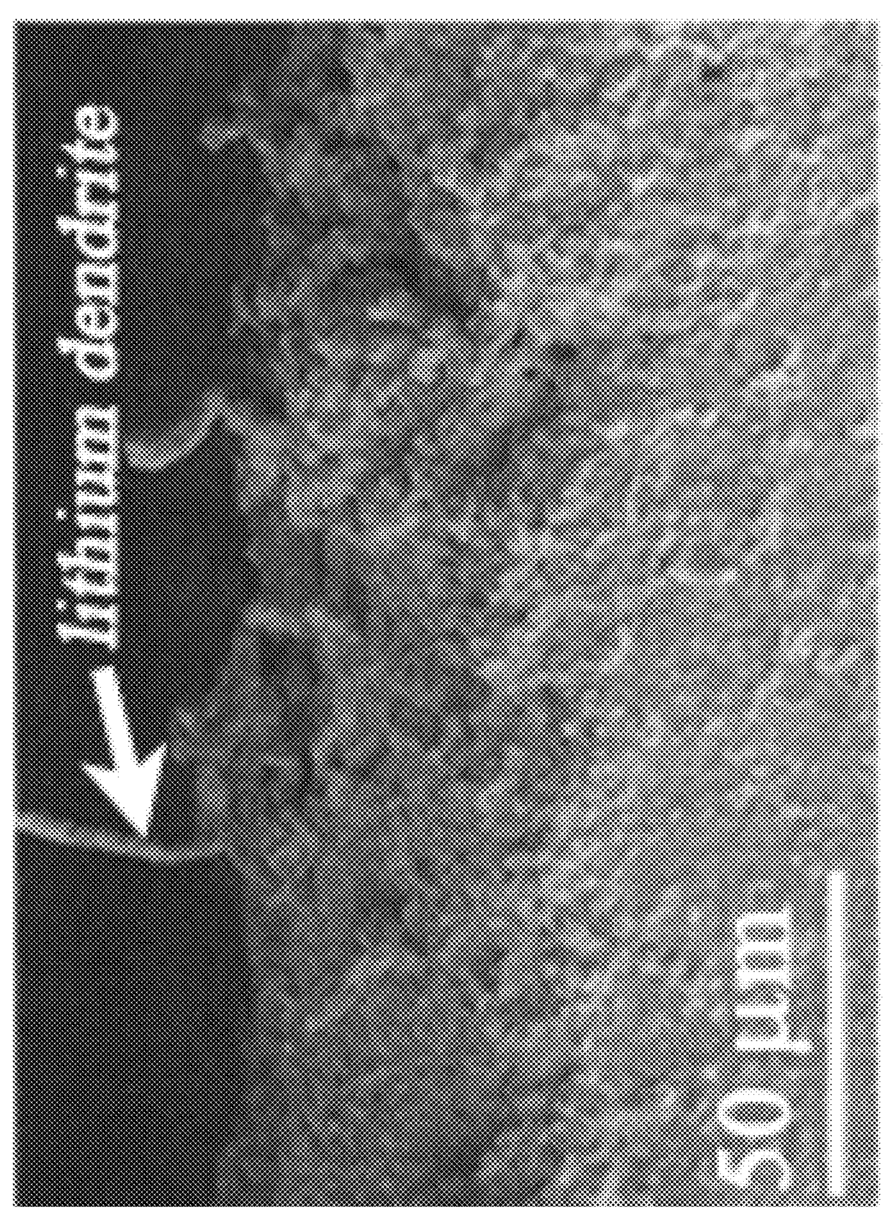
FIGS. 4B-4E are SEM images of the three separator films of FIG. 4A after Li stripping and plating cycling.
Figure 4C:
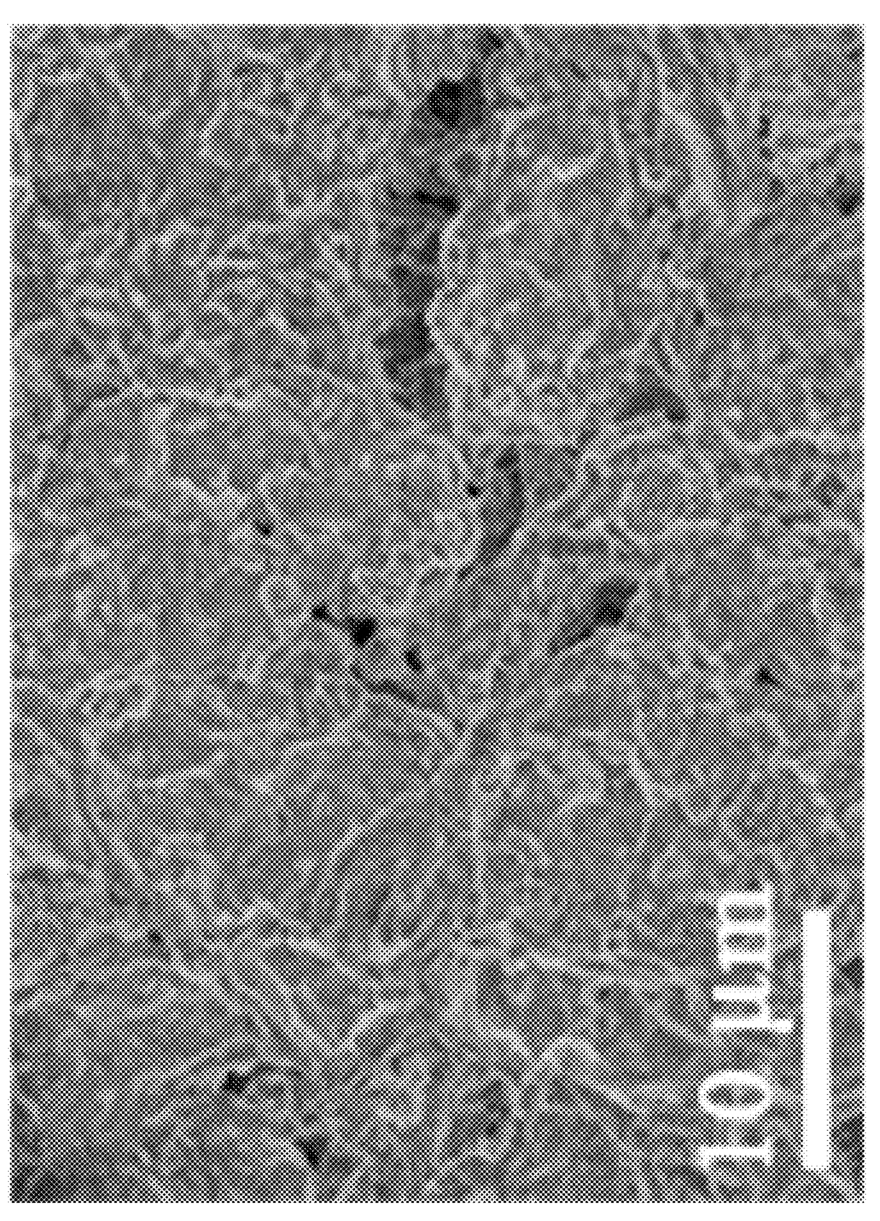
Figure 4D:
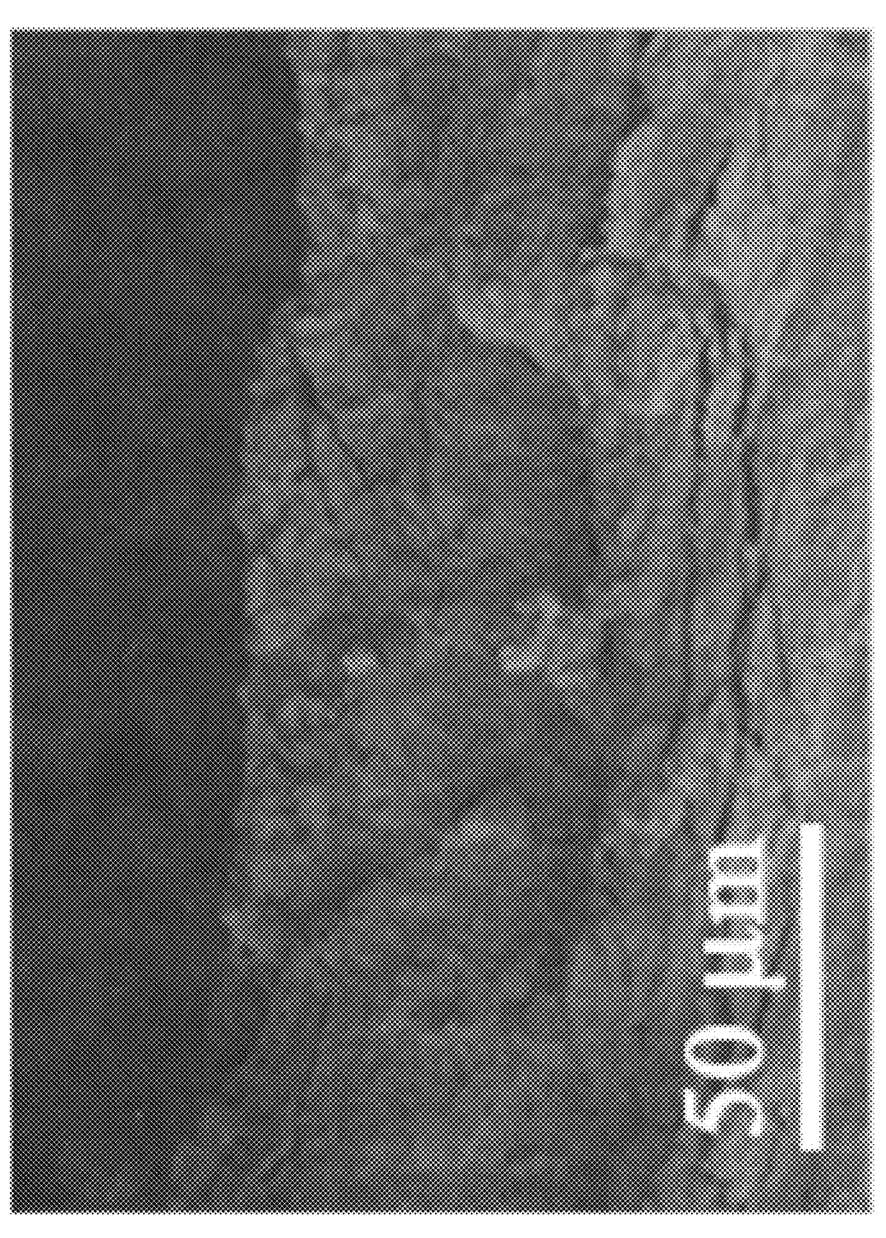
Figure 4E:
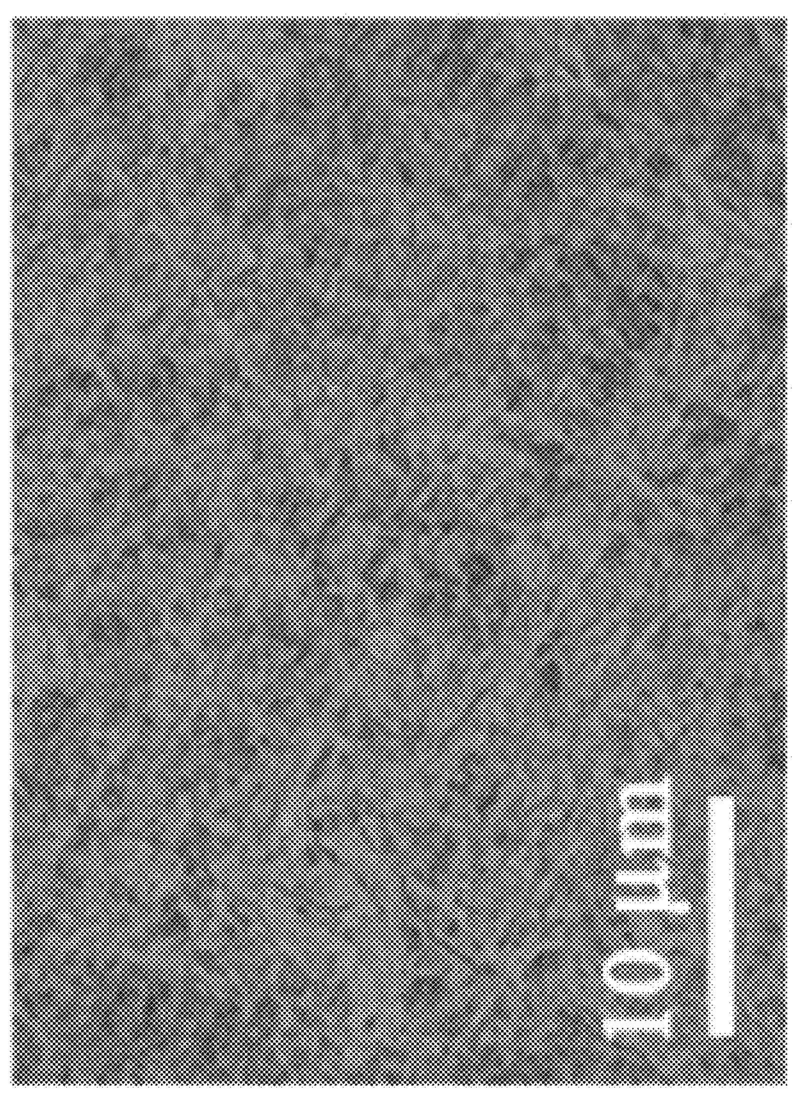

To examine fault mechanisms, cycled cells were disassembled and the structural changes in the lithium electrodes were imaged using an SEM. FIGS. 4B and 4C show the cross-section and surface SEM images of the lithium plate in the symmetric cell with a C-2400 separator after 60 hours of testing. Lithium dendrites are clearly visible, as indicated by the arrow in FIG. 4B. The figure also shows that the surface is rough and granular, the signature of nonuniform Li plating. In contrast, no lithium dendrites are observed in the lithium plate for the Li//Li cell with an o-BC/$SiO_2$ 116 separator (FIG. 4D). The figure also shows that the surface is smooth and uniform even after 200 hours of cycling. These observations reveal that the contemplated o-BC/$SiO_2$ separators can more effectively regulate the lithium plating processes and suppress lithium dendrite formation and surface coarsening than the conventional C-2400 separators. The greater performance of the o-BC/$SiO_2$ 116 separator over C-2400 can be attributed to the higher Li+ ion adsorption capability as a result of the stronger interaction between Li+ with o-BC 106 and $SiO_2$. The ability to absorb Li+ by a separator in a high-rate plating process will adjust and homogenize Li+ flux toward the plated Li electrode, resulting in uniform deposition and preventing dendrites formation and Li metal surface roughening.

Similarly, when using an o-BC 106 film as the separator, the lithium plate after cycling is also dendrite-free and very dense, without the granular and/or porous structure. The abundant oxygen functional groups on the bacterial cellulose 102 are lithiophilic sites and can also serve to regulate and homogenize the Li+ flux, leading to uniform Li deposition on the Li plate.

Figure 4F:
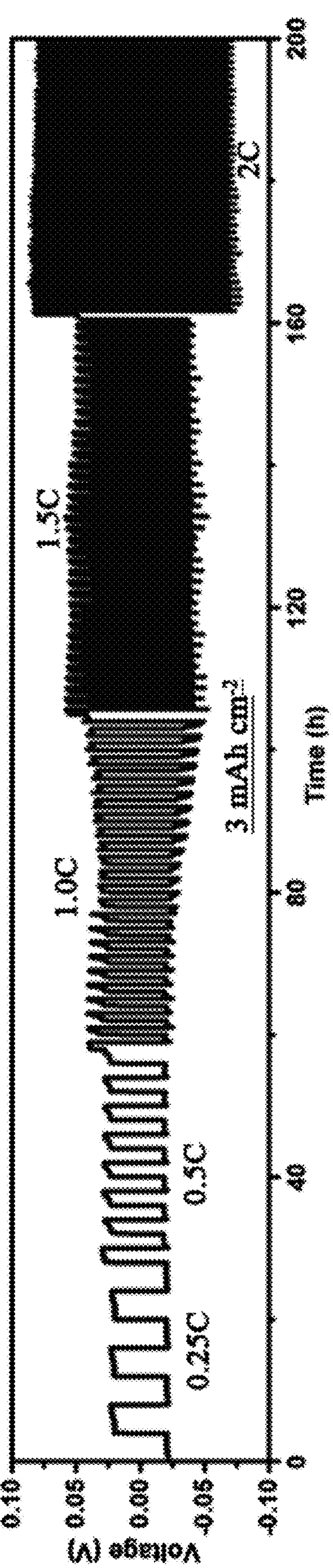
FIG. 4F is a voltage over time plot for a symmetric Li//Li cell with an o-BC/$SiO_2$ separator.
Figure 4G:
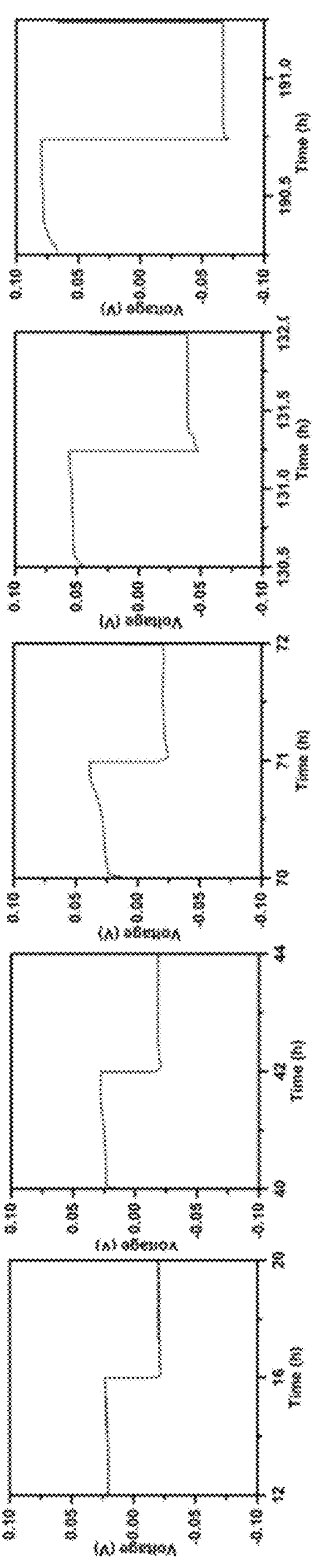
FIG. 4G shows different charge-discharge voltage profiles under different current densities for the Li//Li cell of FIG. 4F.

The stripping/plating rate performance of the Li//Li cell with the o-BC/$SiO_2$ 116 separator was further evaluated, and the results are presented in FIG. 4F. With the cycling current density increased from 0.75 to 6 mA cm' and maintaining the same specific capacity of 3 mAh cm', the polarization voltage rises from –25 to –90 mV and then maintains a relatively steady value of ~90 mV at 6 mA cm' during cycling. Several representative charge-discharge voltage profiles under different current densities are presented in FIG. 4G. The charge and discharge plateaus are smooth without any spikes for the much higher 6 mA cm' current density, reflecting stable Li+ redox reactions on the surface of the Li electrode.

Figure 4H:
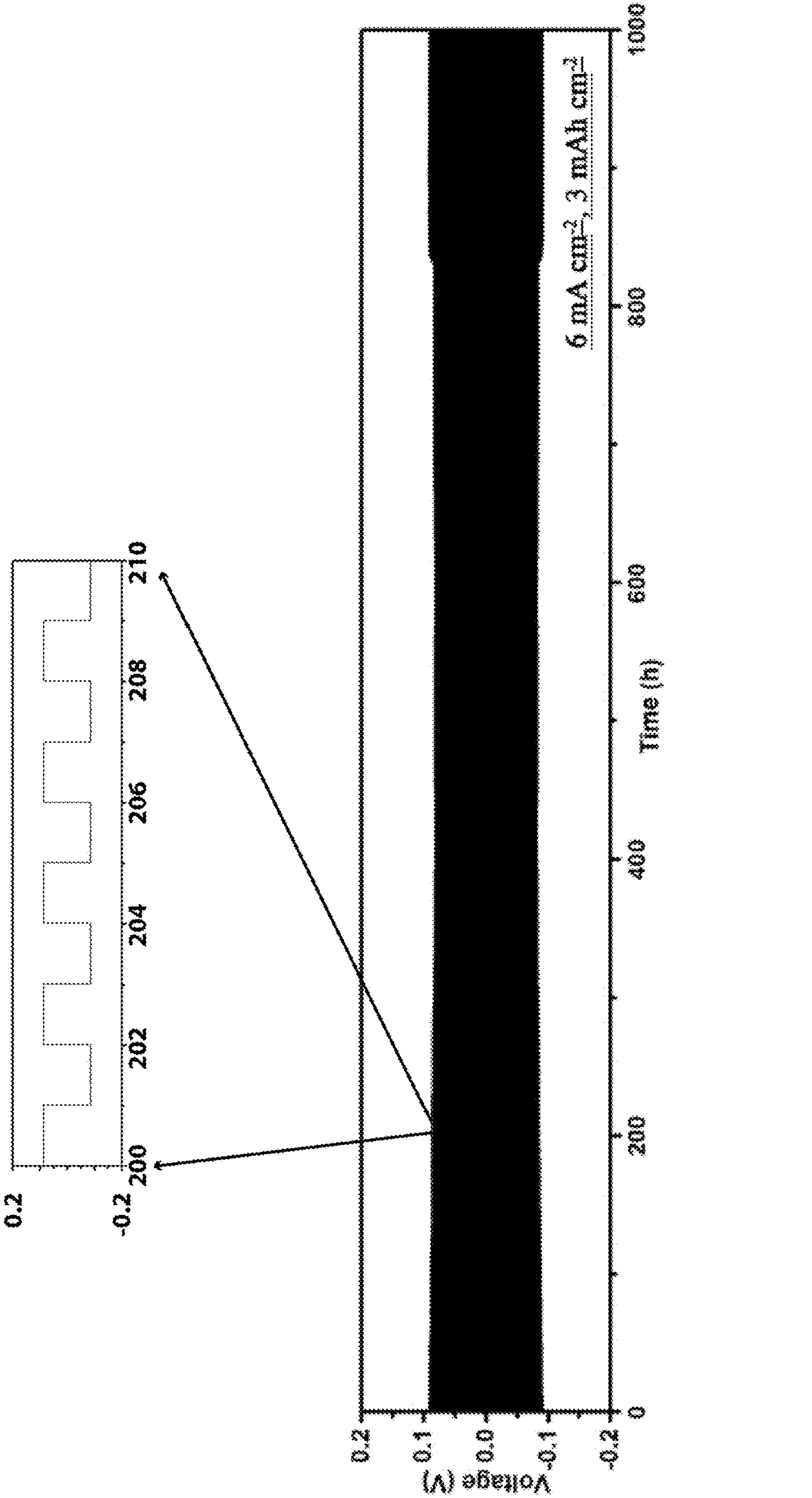
FIG. 4H is a voltage over time plot for the Li//Li cell demonstrating long cycling stability.

To further demonstrate the potential of the o-BC 106 separator for fast charge-discharge and long cycling stability, the Li//Li symmetric cell was cycled at the 6 mA cm' current density for 1000 hours. As shown in FIG. 4H, the overpotential maintains a value of ~90 mV for the first 850 hours and then increases to –100 mV slowly upon cycling up to the 1000th hours. This excellent performance for long cycling times at large current densities demonstrates the contemplated o-BC/$SiO_2$ 116 film's ability to homogenize the Li-ion flux and prohibit the dendrite formation during the Li plating process. According to various embodiments, these functionalized BC-based separators 122 have the potential to be the choice of Li metal-based battery technology in the future. The polarization voltage stabilizes at ~100 mV at a 6 mA cm' current density for ~200 hours and gradually increases to –140 mV by the 1000th cycle.

Figure 5A:
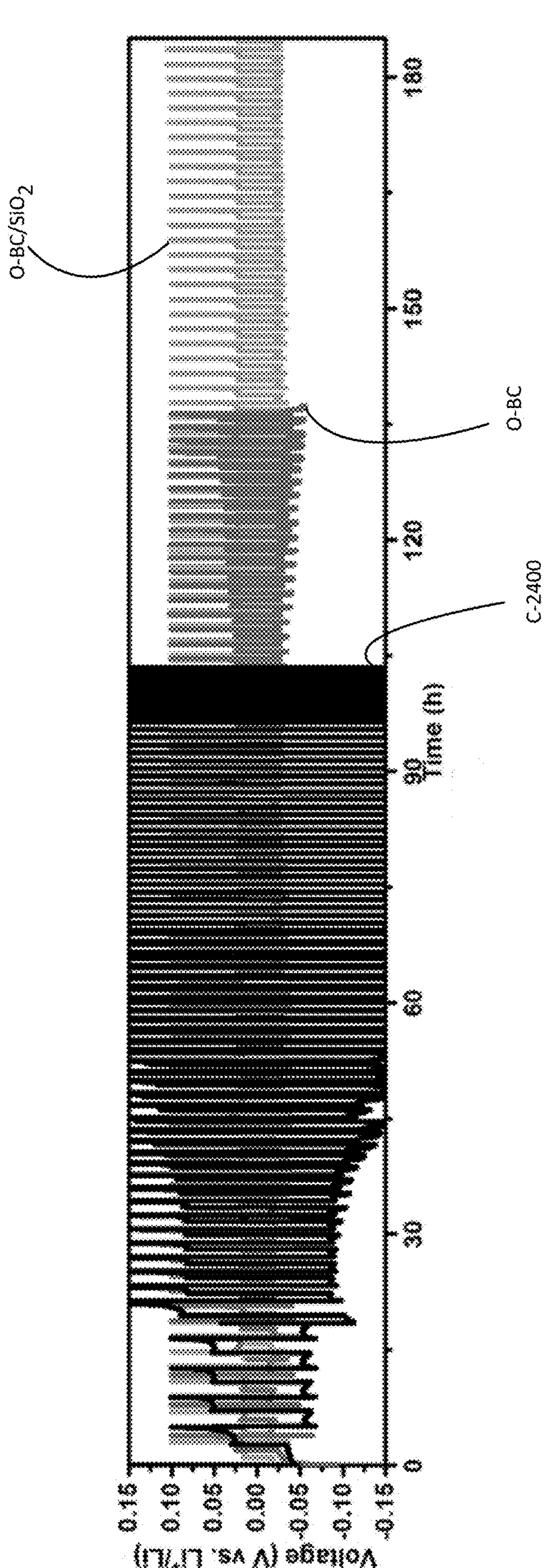
FIG. 5A shows the cycling performance of a Li//Cu asymmetric cell with three different separators.

The evaluation of this specific, non-limiting embodiment continued with the assembly of asymmetric cells comprised of a Li foil as the negative electrode, a copper foil as the positive electrode, and the C-2400 or the o-BC 106 based film as the separators. These asymmetric cells were tested to further evaluate the performance of the different separator films. For these tests, the charging cutoff voltage was set to 0.1 V. As shown in FIG. 5A, with the fixed capacity of 2 mAh cm', the C-2400 cell can only survive for a few cycles under a relatively low current density of 1.0 mA cm'. Specifically, the C-2400 and o-BC-based cells were cycled at the current density of 1.0 mA cm' at the first five cycles and the o-BC/$SiO_2$-based cell was cycled at the current density of 2.0 mA cm' from the beginning.

Figure 5B:
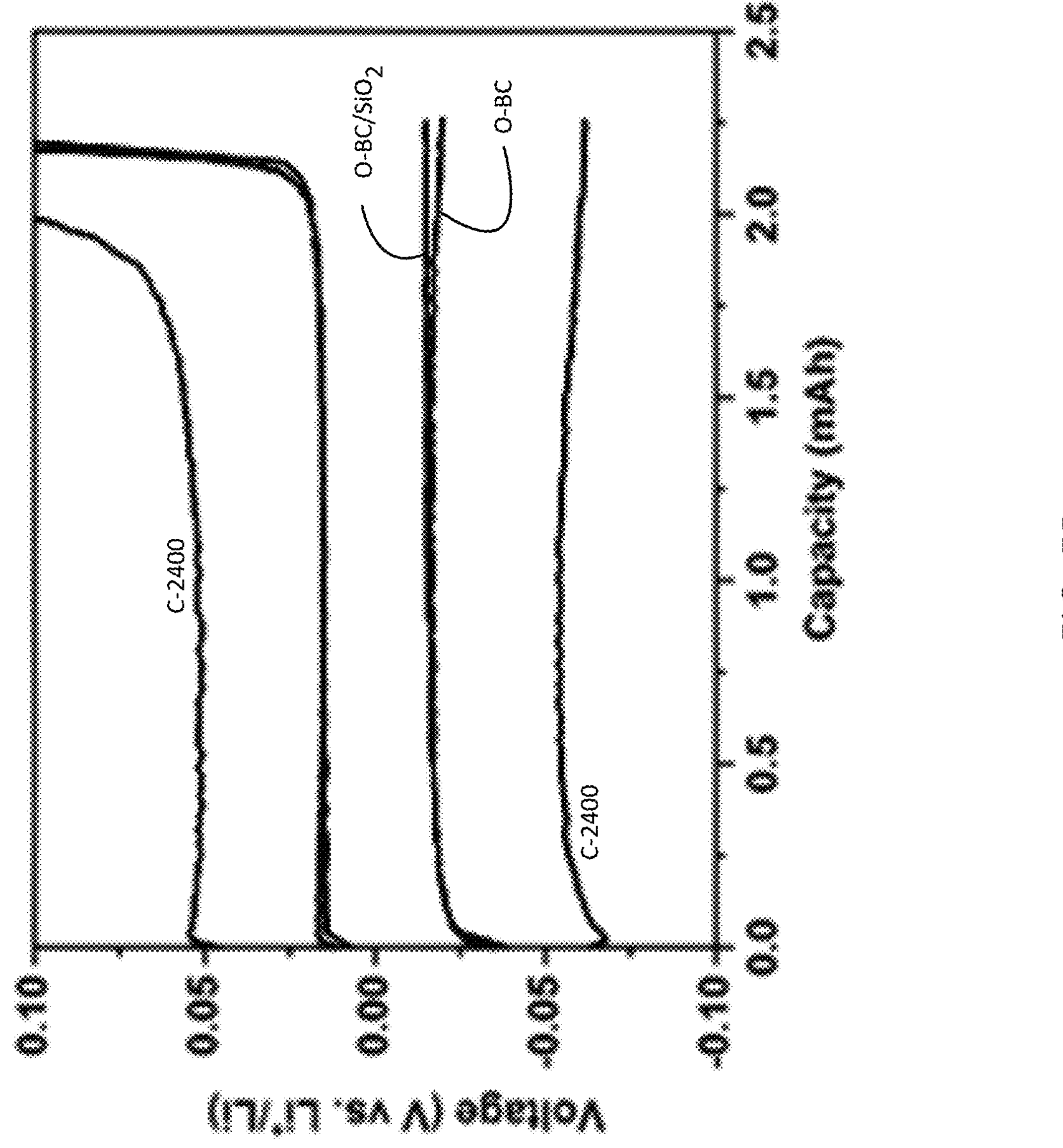
FIG. 5B shows the voltage profiles for the three cells of FIG. 5A.
Figure 5C:
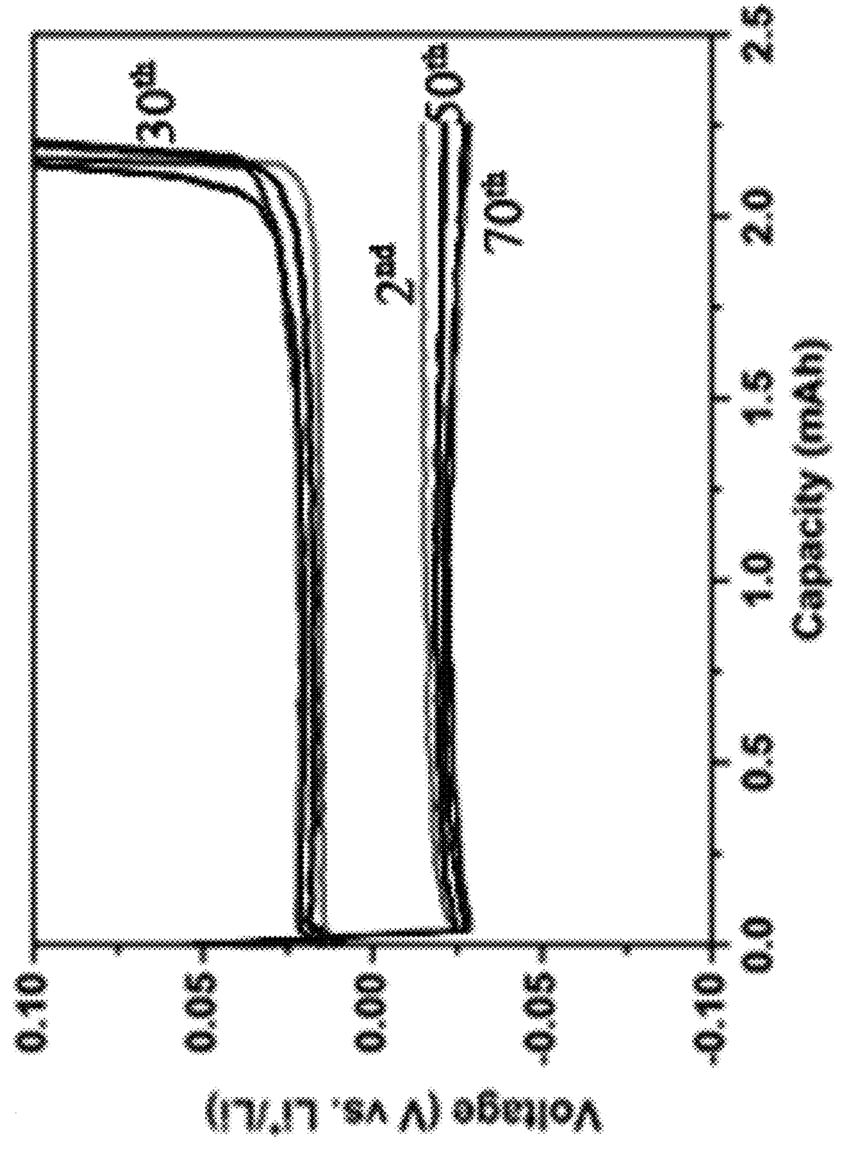
FIG. 5C shows the voltage profiles of the o-BC/$SiO_2$ based cell at different current densities in different cycles.
Figure 5D:
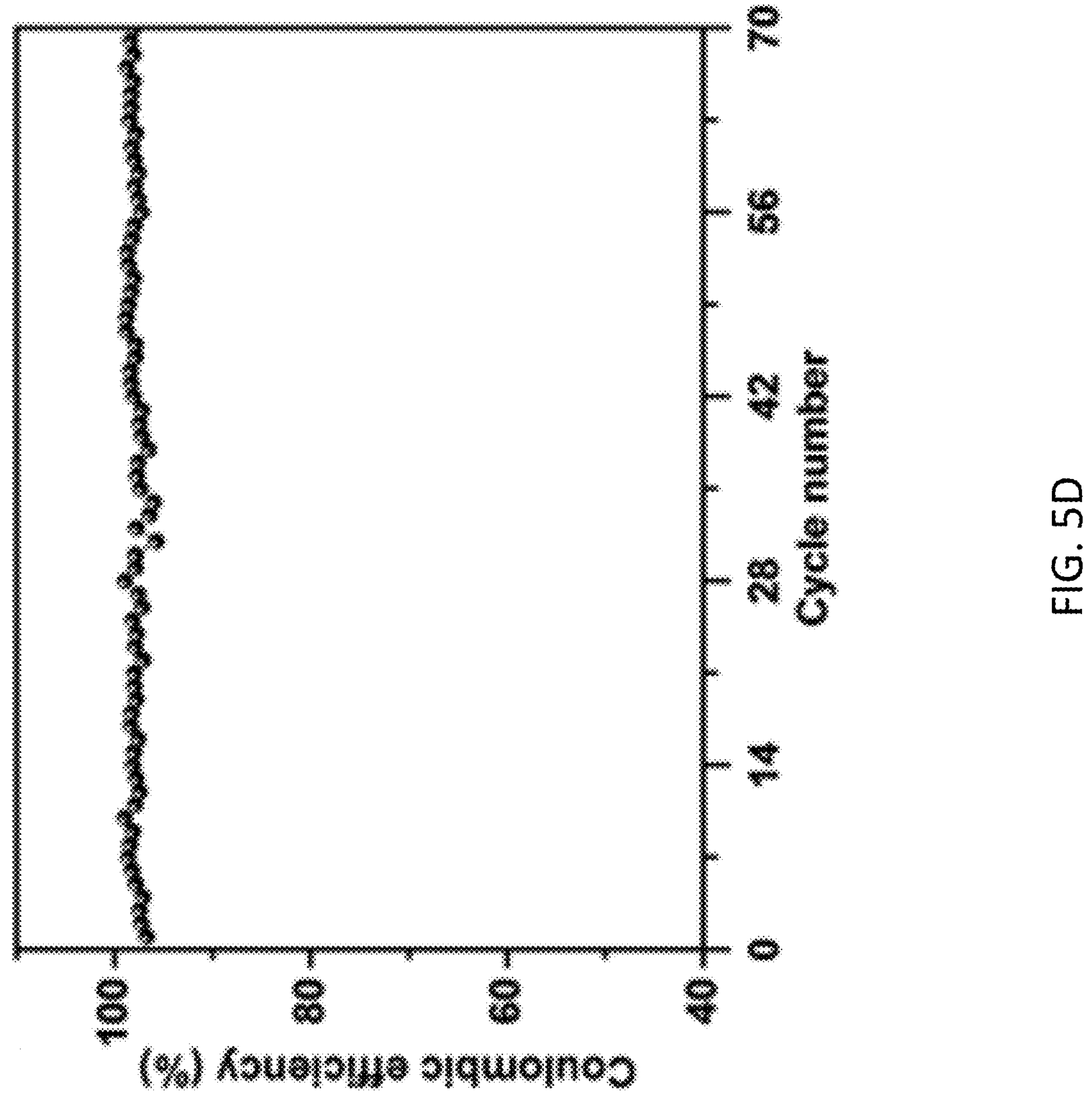
FIG. 5D shows the Coulombic efficiency of the o-BC/$SiO_2$ based cell.

The cell with the o-BC 106 separator exhibits a much longer lifetime, failing after ~130 hours at a current density of 2 mA $cm^{-2}$. Overall, the o-BC/$SiO_2$ 116 separators offer the best performance of these specific non-limiting examples, as it is stable over 180 hours of cycling. The voltage profiles at different capacities of the three cells are compared in FIG. 5B. Cells with o-BC 106 and o-BC/$SiO_2$ 116 separators have similar polarization potential (~24 mV) which is significantly lower than the C-2400 cell (~50 mV). During cycling, the o-BC/$SiO_2$ 116 based cell maintained its stability (FIG. 5C), and Coulombic efficiency of around 98.5% was achieved (FIG. 5D).

By incorporating this o-BC/$SiO_2$ 116 composite separator into the Li//Li symmetric and Li//Cu asymmetric cells for the Li stripping/plating study, lower polarization voltage, higher coulombic efficiency, and much longer lithium stripping/plating cycling stability was observed over cells using either the conventional Celgard 2400 (C-2400) separator or the pristine BC separator. As a result, subsequently fabricated Li//S and Li//$LiFePO_4$ batteries had markedly improved electrochemical performances. For example, in one embodiment, a LSB cell with 4 mg cm' of sulfur loading can deliver 1250 mAh $g^{-1}$ of specific capacity at 0.1 C and maintain 83% capacity after 100 cycles at 0.25 C. The LMB cell based on Li//$LiFePO_4$ shows high and more stable Coulombic efficiency (~99.5%) while cycling 200 times at 0.2 C.

In addition to the symmetric and asymmetric cells discussed above, two different types of lithium metal batteries were chosen to demonstrate the feasibility of this specific embodiment of the contemplated o-BC/$SiO_2$ 116 separator. Specifically, a Li//S battery and a Li//$LiFePO_4$ battery. For the LSB, lithium metal was used as the anode, sulfur loaded in a carbonized BC (cBC) film as the cathode, the C-2400 or the BC-based film as the separator, 1 M bis(trifluoromethane)sulfonamide lithium salt (LiTFSI) with 1 wt % $LiNO_3$ dissolved in a 1:1 v/v % mixture of 1,3-dioxolane (DOL)/dimethylethane (DME) solution as the electrolyte. For the Li//$LiFePO_4$ battery, a commercial $LiFePO_4$/aluminum foil (single side coated, 12 mg $cm^{-2}$, MTI corporation) was used as the cathode, 1 M $LiPF_6$ in ethylene carbonate (EC), and ethyl methyl carbonate (EMC) was used as the electrolyte (MTI corporation). Again, this is continuing the discussion of the specific, non-limiting example mentioned above. Other embodiments of the contemplated separators may be adapted into lithium-based batteries using different sizes, materials, and/or electrolytes.

As previously mentioned, in addition to addressing the above Li anode issues, for Li—S batteries, shuttling of lithium polysulfides in Li—S batteries must also be inhibited to prevent low Coulombic efficiency and short battery lifetime. The separator 122 used in LSBs could help to attack this problem by curbing the diffusion of polysulfides. With this in mind, the specific embodiment of the contemplated o-BC 106 and o-BC/$SiO_2$ 116 films were subjected to polysulfide diffusion experiments. Specifically, the two compartments are isolated by the separator 122, with the left side being 20 mM $Li_2S_6$ electrolyte and the right side being a blank electrolyte. All the films were shown to have the ability to block polysulfide migration at the beginning. However, polysulfide diffusion across the C-2400 film became obvious after 6 h, resulting in a color change in the left compartment. In contrast, the o-BC 106 and o-BC/$SiO_2$ 116 films can successfully curb the polysulfide diffusion over 24 hours of testing, a result of the strong interaction between the polysulfides and $SiO_2$/oxygen functional groups. Without similar active binding sites on C-2400, it can only physically block polysulfides diffusion for a short time.

Figure 6A:
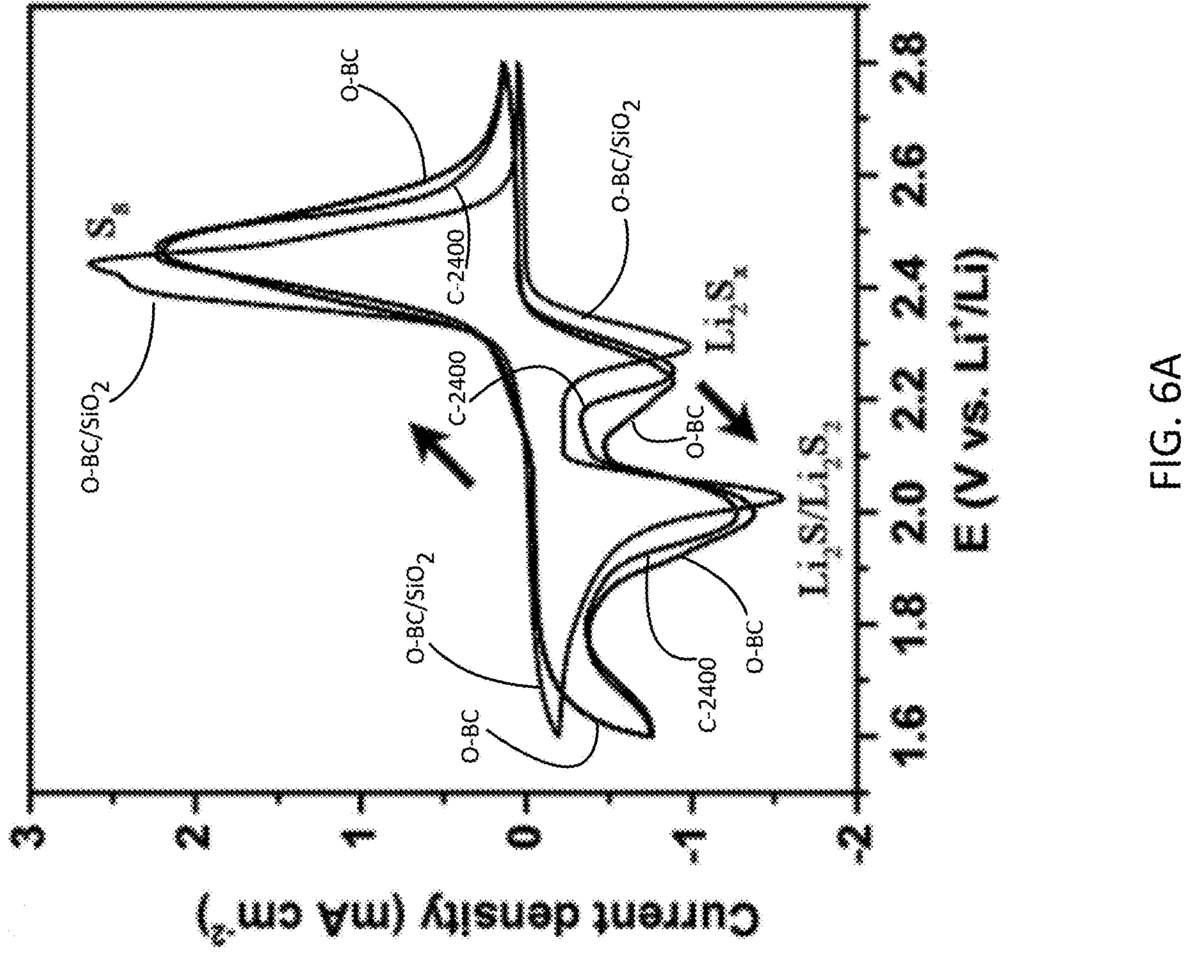
FIGS. 6A-6B show CV curves and EIS Nyquist plots for LSB cells with three different separators.

The coin-type LSB cells with the different separators were evaluated by CV and EIS techniques. As presented in FIG. 6A (CV curves recorded at 0.1 $mVs^{-1}$), all cells show three peaks located at −2.30, 2.05, and 2.45 V originating from conversion of $S_8$ to $Li_2Sx$ (x≥4), $Li_2Sx$ to $Li_2S/Li_2S_2$, and $Li_2S/Li_2S_2$ to $L_2Sx$, respectively. The peak currents and potential differences between the redox peaks can be used to compare the related reaction kinetics. The o-BC/$SiO_2$ 116 based LSB has the highest peak currents and smallest peak potential differences among the three cells, indicating that the o-BC/$SiO_2$ 116 separator has the attractive capability to boost the redox reactions of polysulfides.

Figure 6B:
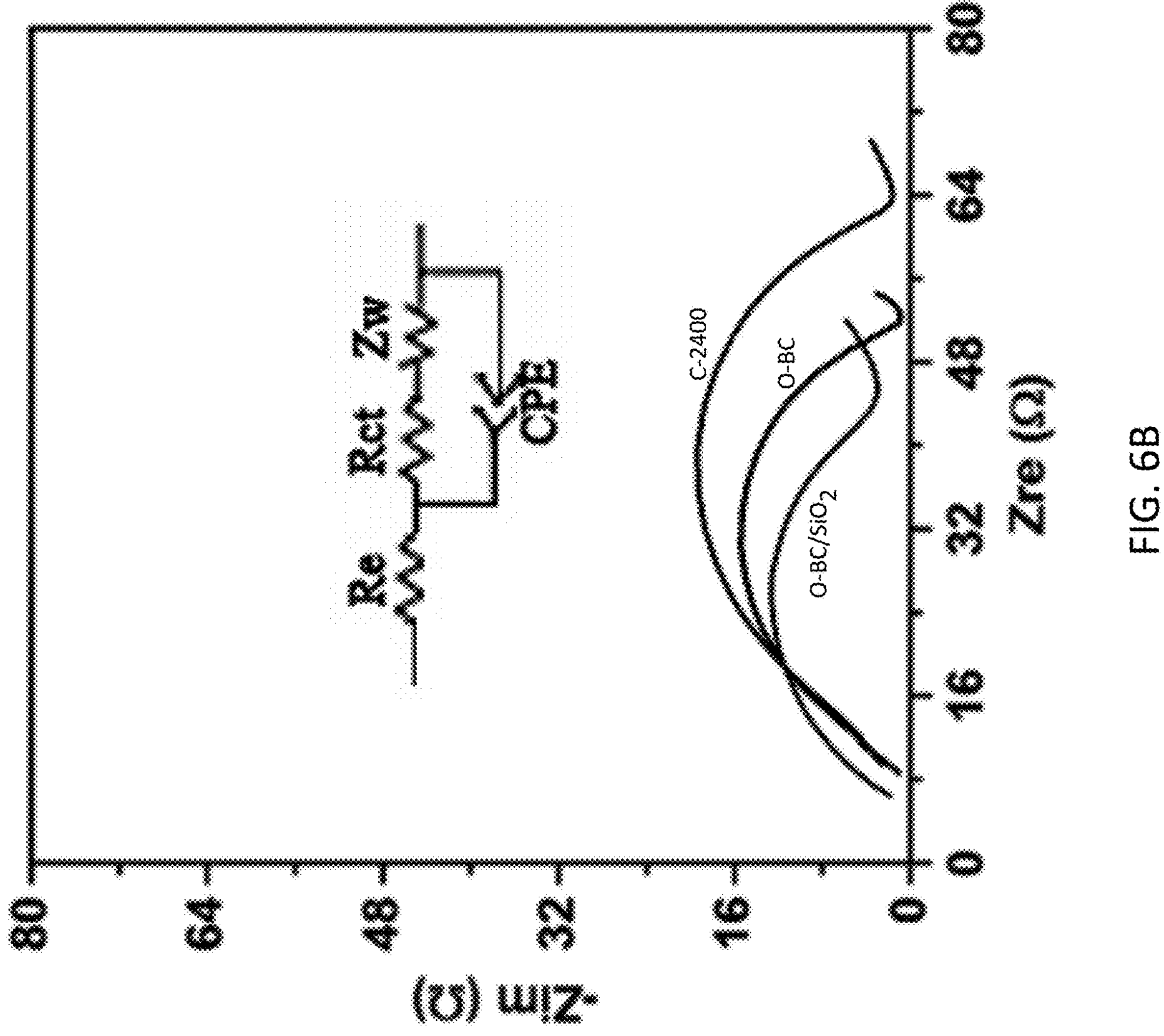

The charge transfer resistance (Rct) can be derived by fitting the Nyquist plots using the equivalent circuit presented in FIG. 6B. Again, the cell with o-BC/$SiO_2$ 116 separator has the lowest Rct of ~39Ω, while it is around 55 and 44Ω for C-2400 and o-BC 106 based cells, respectively.

Figure 6C:
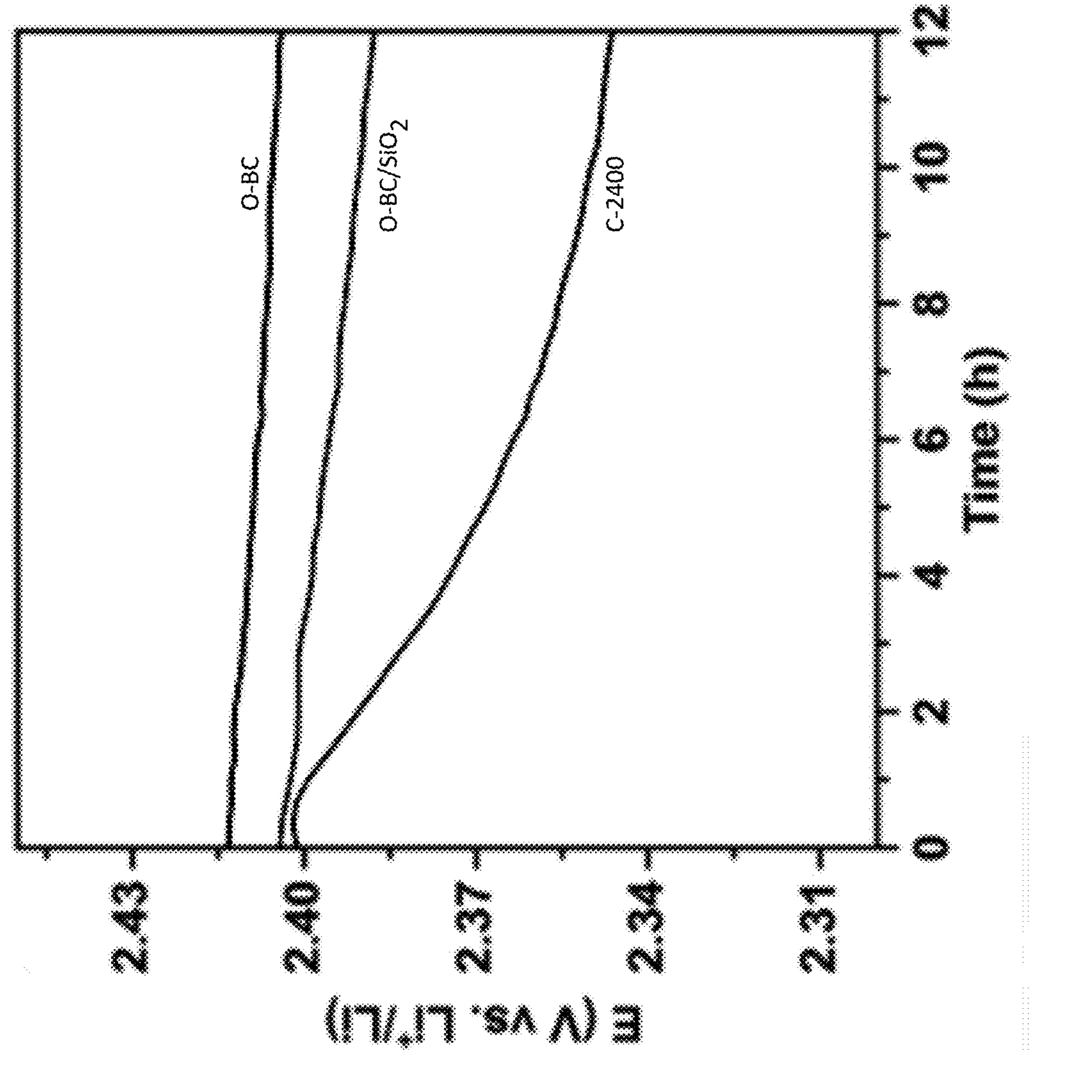
FIGS. 6C-6D show the open-circuit voltage (OCV) over time and as a function of specific capacity, for LSB cells with three different separators.

If the shuttling process of polysulfides is not suppressed, self-discharging can become prevalent in the LSBs. After the first charging process, the open-circuit voltage (OCV) of cells with different separators were monitored for 12 hours and the results are summarized in FIG. 6C. The C-2400 cell experiences a relatively fast voltage drop from 2.41 to 2.35 V, while both o-BC 106 and o-BC/$SiO_2$ 116 based cells exhibit very stable OCV, suggesting the self-discharging, or polysulfides shuttling, has been effectively suppressed by the o-BC 106 and o-BC/$SiO_2$ 116 separators.

Figure 6D:
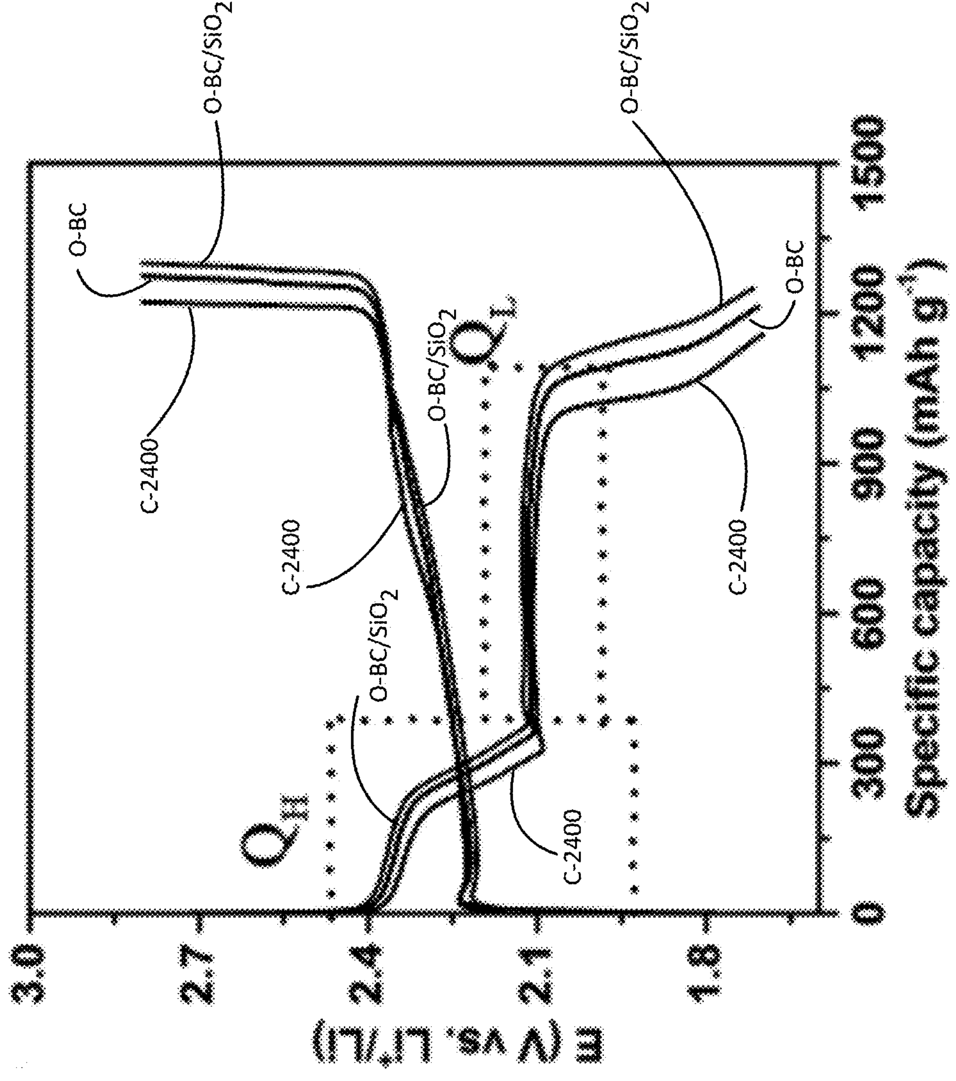
Figure 6E:
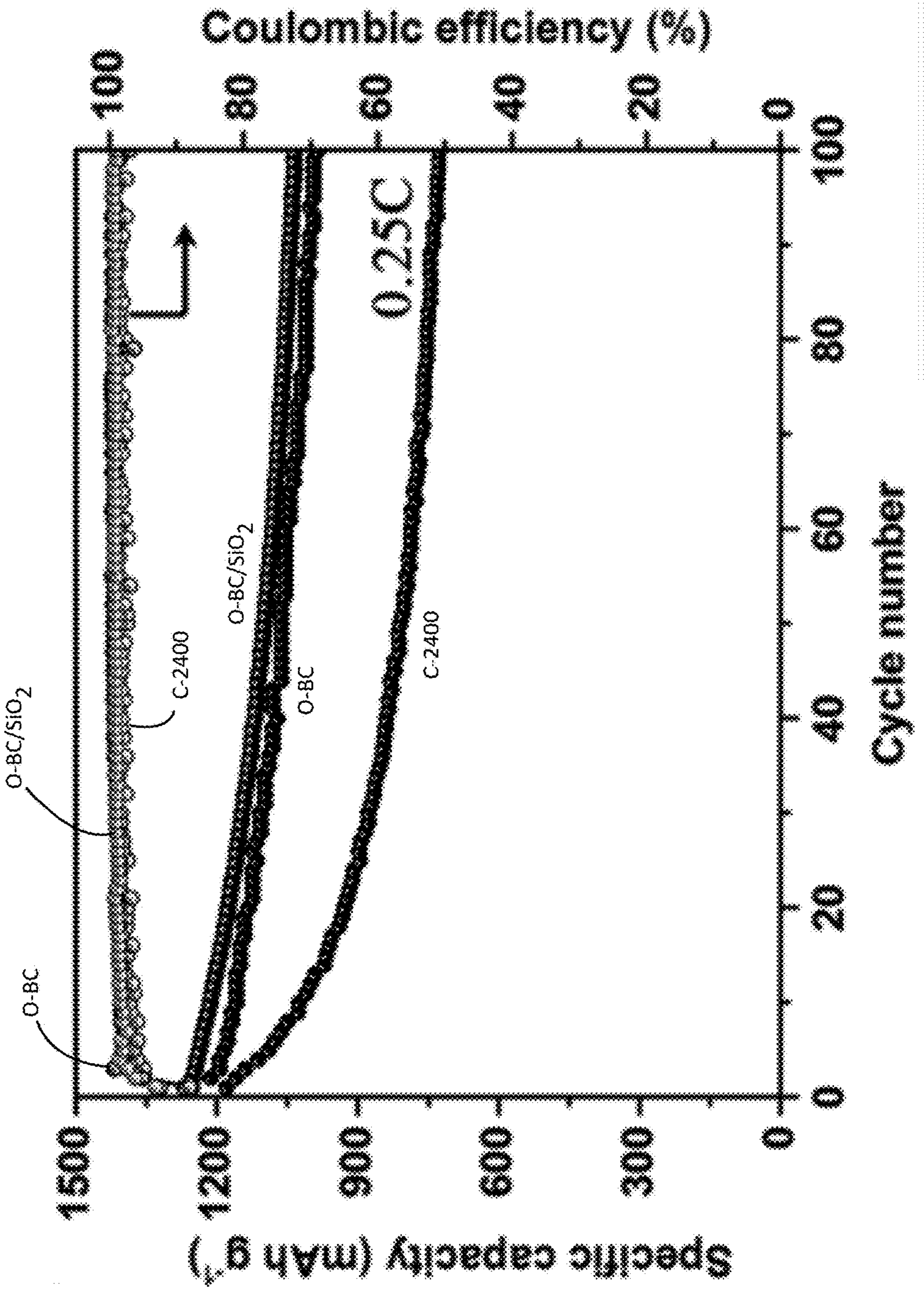
FIG. 6E shows the cycling performance of different separator based LSBs.

To verify that the function of BC-derived separators in improving battery performance, LSB cells with a large sulfur loading of 4 mg $cm^{-2}$ were assembled. A carbonized BC nanofiber film loaded with sulfur was used for the cathode because it offers highly conductive networks and abundant surfaces for sulfur/polysulfides to attach. These cells were cycled at 0.25 C for 100 cycles. As illustrated in FIG. 6D, the cell using an o-BC/$SiO_2$ 116 separator delivers a larger capacity during discharge, with both higher QH that corresponds to the discharge capacity for $S_8$ to $Li_2Sx$ conversion and QL that corresponds to $Li_2Sx$ to $Li_2S/Li_2S_2$ conversion, than the o-BC-based and the C-2400-based cells. The trend of discharge capacity variation of the three cells is consistent with our expectation based on the CV results. As shown in FIG. 6E, during cycling the C-2400 cell shows a faster specific capacity decay than the other two and maintains a capacity of ~740 mAh $g^{-1}$ up to the 100th cycle. Comparatively, the cell with o-BC 106 or o-BC/$SiO_2$ 116 can still deliver 1000 mAh $g^{-1}$ of capacity up to the 100th cycle (~985 mAh $g^{-1}$ for o-BC 106 cell and 1033 mAh $g^{-1}$ for the o-BC/$SiO_2$ 116 cell). In addition, the o-BC/$SiO_2$ 116 cell also exhibits higher Coulombic efficiency (>99%) than its counterparts.

Figure 6F:
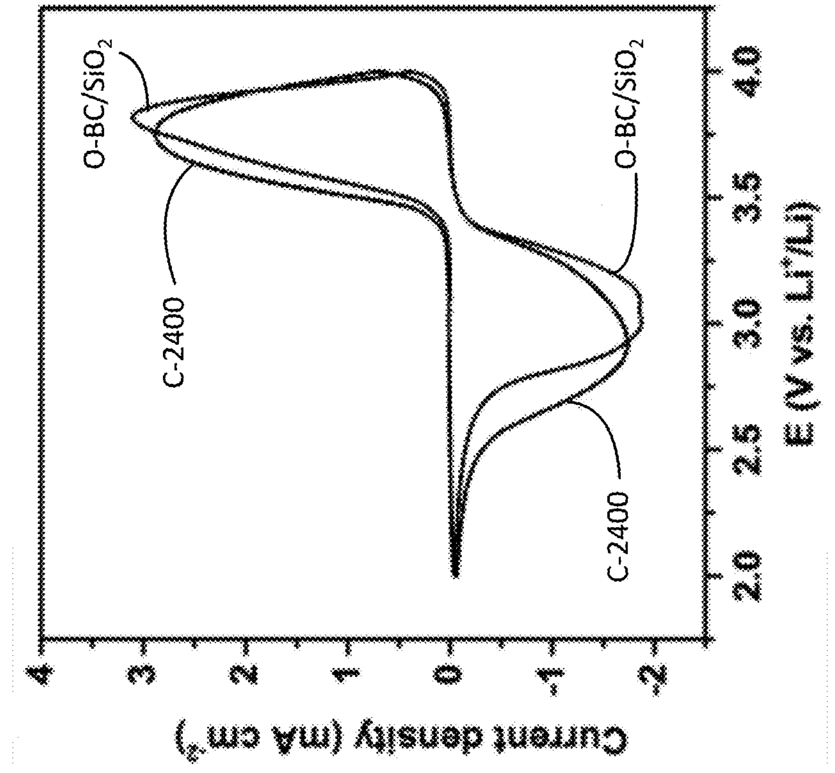
FIGS. 6F and 6G show CV curves and cycling performance of a Li//$LiFePO_4$ cell with C-2400 or o-BC/$SiO_2$ separators, respectively.
Figure 6G:
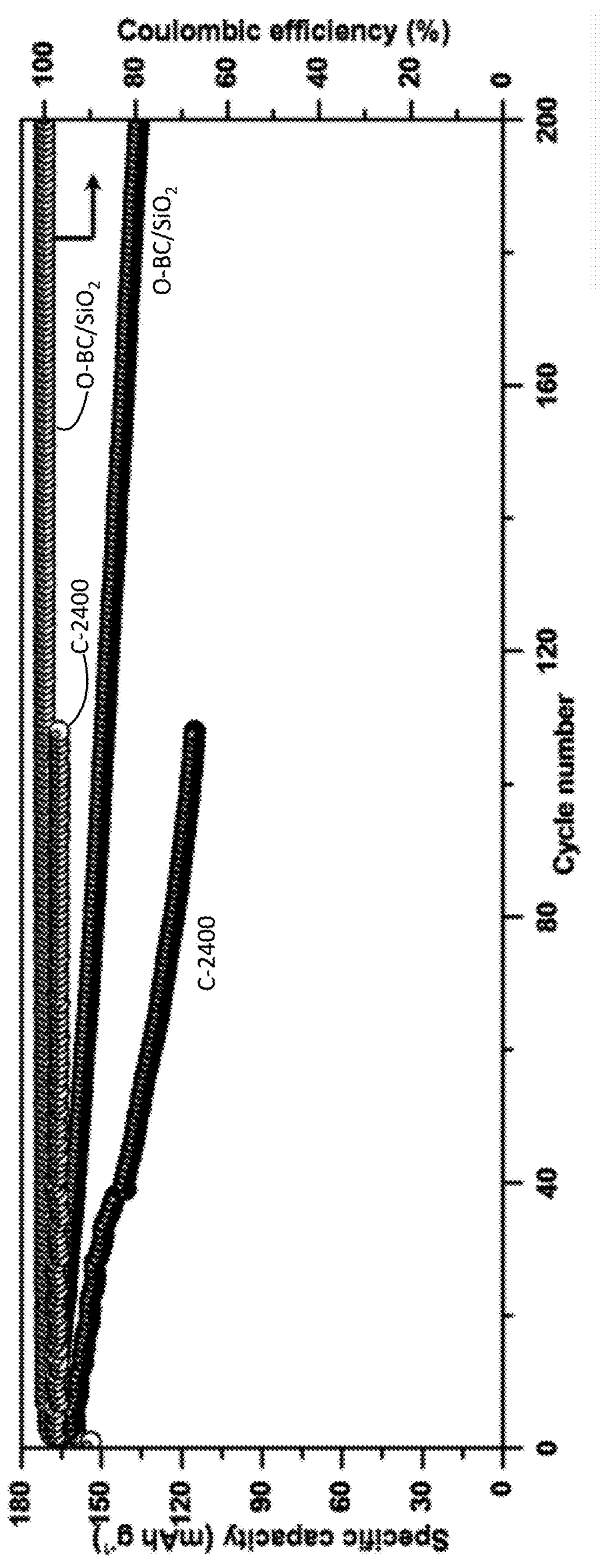

Li//$LiFePO_4$ cells with C-2400 and o-BC/$SiO_2$ 116 separators were also assembled and tested. FIG. 6F presents the CV curves recorded between 2.0 and 4.0 V at a scan rate of 0.1 mV $s^{-1}$. The redox peak currents and peak potential differences of the o-BC/$SiO_2$ 116 based cell are also superior to those of the C-2400 based cell. When both cells are cycled at 0.2 C, the cell with the C-2400 separator suffers from quicker capacity decay and lower Coulombic efficiency, as shown in FIG. 6G. Although the o-BC/$SiO_2$ 116 cell also shows the specific capacity decrease during cycling, it only slowly decreases from the initial value of 165 to 136 mAh $g^1$ after 200 cycles, again demonstrating the capability of the o-BC/$SiO_2$ 116 separator in improving the battery performance. The improved performance is attributed to the capability of $SiO_2$ functionalized BC to regulate the Li+ flux to the anode during the Li deposition.

In some embodiment, the battery separator contemplated herein may have a thickness between 25 μm and 30 μm. In other embodiments, the contemplated separator may have a thickness in the range of 10 μm to 40 μm. Additionally, in some embodiments the contemplated separator may have a density between 10 and 50 $g/m^2$.

Where the above examples, embodiments and implementations reference examples, it should be understood by those of ordinary skill in the art that other materials and techniques could be intermixed or substituted with those provided. In places where the description above refers to particular embodiments of oxidized bacterial cellulose separators for batteries and method for producing the same, it should be readily apparent that a number of modifications may be made without departing from the spirit thereof and that these embodiments and implementations may be applied to other battery technologies as well. Accordingly, the disclosed subject matter is intended to embrace all such alterations, modifications and variations that fall within the spirit and scope of the disclosure and the knowledge of one of ordinary skill in the art.

What is claimed is:

1. A method for fabricating a separator for a lithium-based battery, comprising:

oxidizing cellulose fibrils to form oxidized cellulose having carboxylic functional groups;

decorating the oxidized cellulose with nanoparticles; and forming the nanoparticle-decorated oxidized cellulose into a film to become the separator for the lithium-based battery;

wherein the nanoparticles are composed of a sulfide material comprising one of $TiS_2$, $MoS_2$, $NiCo_2S_4$, $NiCo_2(O—S)_4$, $V_2S_5$, and O-doped $Sb_2S_3$.

2. The method of claim 1, wherein the cellulose is a bacterial cellulose.

3. The method of claim 1, wherein the cellulose fibrils are oxidized through a TEMPO oxidation.

4. The method of claim 1, wherein decorating the oxidized cellulose with nanoparticles comprises introducing a precursor solution to the oxidized cellulose that reacts with hydroxyl groups of the oxidized cellulose while preserving the carboxylic functional groups, causing the nanoparticles to nucleate on the surface of the oxidized cellulose.

5. The method of claim 2, wherein the lithium-based battery is a lithium-metal battery.

6. The method of claim 2, wherein the lithium-based battery is a lithium-sulfur battery.

* * * * *